(12) United States Patent
Nishizaka et al.

(10) Patent No.: US 10,737,892 B2
(45) Date of Patent: Aug. 11, 2020

(54) MEDIUM FEEDING DEVICE AND IMAGE READING APPARATUS

(71) Applicant: SEIKO EPSON CORPORATION, Tokyo (JP)

(72) Inventors: Katsuhiko Nishizaka, Kitakyushu (JP); Masaki Namiki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/189,839

(22) Filed: Nov. 13, 2018

(65) Prior Publication Data

US 2019/0144225 A1 May 16, 2019

(30) Foreign Application Priority Data

Nov. 15, 2017 (JP) .................................. 2017-219717

(51) Int. Cl.
*B65H 3/56* (2006.01)
*B65H 3/06* (2006.01)
*H04N 1/00* (2006.01)

(52) U.S. Cl.
CPC .............. *B65H 3/56* (2013.01); *B65H 3/063* (2013.01); *H04N 1/0062* (2013.01); *B65H 3/0661* (2013.01); *B65H 2801/39* (2013.01)

(58) Field of Classification Search
CPC .......... B65H 3/34; B65H 3/56; B65H 3/0661; B65H 3/523
See application file for complete search history.

(56) References Cited

U.S. PATENT DOCUMENTS

| | | | |
|---|---|---|---|
| 5,906,366 A * | 5/1999 | Chang | B65H 1/06 221/231 |
| 7,170,658 B2 | 1/2007 | Shirai et al. | |
| 8,985,570 B1 * | 3/2015 | Fang | B65H 1/04 271/121 |
| 9,950,884 B2 * | 4/2018 | Kuriki | B65H 3/0669 |
| 10,246,281 B2 * | 4/2019 | Kuriki | B65H 3/063 |
| 2003/0063337 A1 | 4/2003 | Shirai et al. | |
| 2019/0135564 A1 * | 5/2019 | Machida | B65H 1/04 |
| 2019/0152728 A1 * | 5/2019 | Haug | B65H 3/063 |

FOREIGN PATENT DOCUMENTS

| | | | |
|---|---|---|---|
| JP | 2003-176052 A | 6/2003 | |
| JP | 3711069 B | 8/2005 | |
| WO | WO-2017209174 A1 * | 12/2017 | B65H 1/04 |

* cited by examiner

*Primary Examiner* — Patrick Cicchino
(74) *Attorney, Agent, or Firm* — Workman Nydegger

(57) ABSTRACT

A medium feeding device includes a medium placement portion on which a bunch of media is placed, a feed roller that feeds a lowermost medium of the bunch of media placed on the medium placement portion, a separation roller that is provided at a position facing the feed roller and separates a medium from the bunch of media, and a plurality of restricting portions that are provided on an upstream side of a nip position between the separation roller and the feed roller at an interval in a medium width direction which is a direction intersecting a medium feeding direction and come into contact with leading ends of upper media of the bunch of media excluding at least the lowermost medium such that the leading ends are restricted from coming into contact with the separation roller regardless of whether the separation roller is deformed or not.

8 Claims, 15 Drawing Sheets

FIG. 14
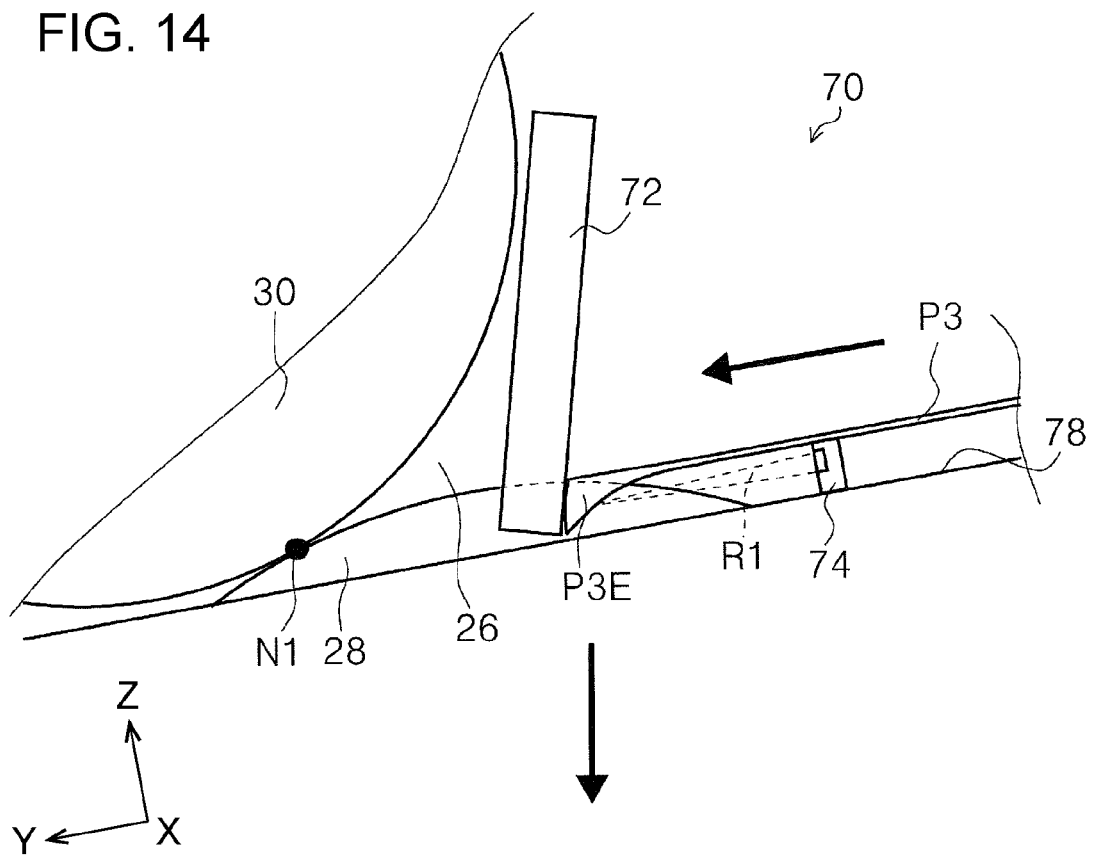
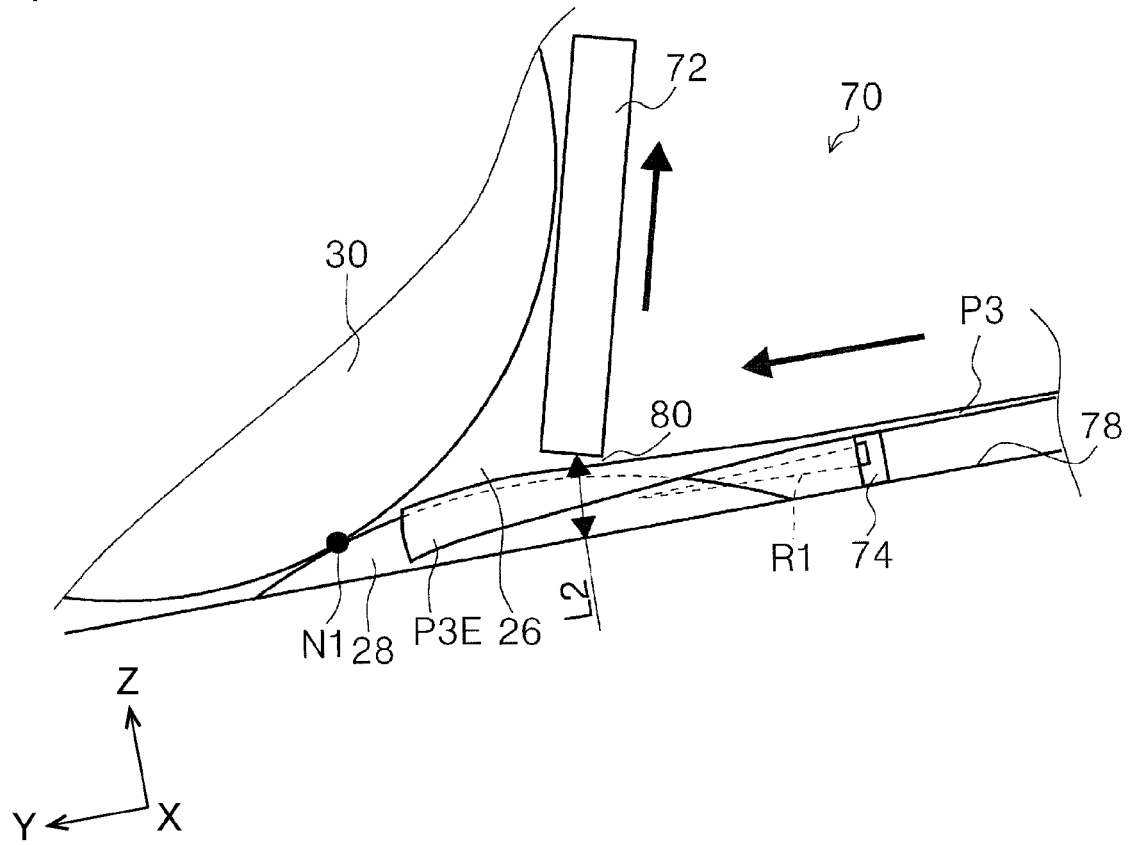

MEDIUM FEEDING DEVICE AND IMAGE READING APPARATUS

BACKGROUND

1. Technical Field

The present invention relates to a medium feeding device feeding a medium and an image reading apparatus provided with the medium feeding device.

2. Related Art

Hereinafter, a scanner, which is an example of an image reading apparatus, or a printer, which is an example of a recording apparatus, is provided with a feeding device that feeds a medium. For the feeding device, a method in which a medium is fed while being nipped between a separation roller to which rotational resistance or a torque in a reverse direction is applied and a feed roller may be adopted as a method of separating media. In the case of such a separation method, when a plurality of media enter a space between the separation roller and the feed roller, a separation ability may be exceeded and multi-feeding may occur.

Japanese Patent No. 3,711,069 discloses a sheet transportation separating device in which a transportation restricting guide that relatively protrudes when a separation roller is deformed is provided in the vicinity of the separation roller for the purpose of reliably separating one sheet from a plurality of sheets and transporting the one sheet even when a plurality of sheets are set. According to the sheet transportation separating device, even when a bunch of sheets, which is a plurality of stacked sheets, enters a space between the separation roller and a feed roller, it is possible to suppress the number of sheets entering a space between roller nips to be an appropriate small number since the bunch of sheets is blocked by the transportation restricting guide without inhibiting the motion of the separation roller, the transportation restricting guide having a sheet blocking function. In addition, even when a sheet is caught on the transportation restricting guide, it is possible to avoid a feeding failure since the separation roller formed of elastic material presses the sheet.

Meanwhile, since the separation roller and the feed roller are formed of elastic material for the purpose of separation, when a following end of a medium in a state of being fed passes through a nip position between the separation roller and the feed roller, an elastically deformed portion recovers the original shape thereof and a phenomenon in which a bunch of media held back (prevented from being multi-fed) by the separation roller is slightly returned to an upstream side occurs (hereinafter, referred to as "kickback phenomenon").

In addition, when the kickback phenomenon occurs, the bunch of media subject to the kickback phenomenon may be inclined and be fed in the inclined state such that a skew occurs.

Since the transportation restricting guide provided in the sheet transportation separating device in Japanese Patent No. 3,711,069 performs transportation restriction of a sheet by relatively protruding when the separation roller is deformed, it is not possible to suppress the kickback phenomenon that occurs when the deformed separation roller recovers the original shape thereof.

SUMMARY

An advantage of some aspects of the invention is to provide a feeding device that has been designed in consideration of suppressing a skew caused by a kickback phenomenon which occurs when a following end of a medium passes through a nip position between a separation roller and a feed roller.

According to an aspect of the invention, there is provided a medium feeding device including a medium placement portion on which a bunch of media, which is a plurality of stacked media, is placed, a feed roller that feeds a lowermost medium of the bunch of media placed on the medium placement portion by rotating in a state of being in contact with the lowermost medium, a separation roller that is provided at a position facing the feed roller and separates the lowermost medium from the bunch of media, and a plurality of restricting portions that are provided on an upstream side of a nip position between the separation roller and the feed roller at an interval in a medium width direction which is a direction intersecting a medium feeding direction and come into contact with leading ends of upper media of the bunch of media excluding at least the lowermost medium such that the leading ends are restricted from coming into contact with the separation roller regardless of whether the separation roller is deformed or not.

In this case, the plurality of restricting portions that come into contact with the leading ends of the upper media of the bunch of media excluding at least the lowermost medium such that the leading ends are restricted from coming into contact with the separation roller regardless of whether the separation roller is deformed or not are provided on the upstream side of the nip position between the separation roller and the feed roller at an interval in the medium width direction which is a direction intersecting the medium feeding direction. Therefore, even when the above-described kickback phenomenon occurs, an influence on the upper media of the bunch of media excluding the lowermost medium can be suppressed and thus a skew caused by the kickback phenomenon can be suppressed.

In the medium feeding device, the restricting portions may be positioned on the opposite sides interposing the separation roller in the medium width direction, which is a direction intersecting the medium feeding direction.

In this case, the restricting portions are positioned on the opposite sides interposing the separation roller in the medium width direction which is a direction intersecting the medium feeding direction. Therefore, inclination of the medium held back by the restricting portions can be suppressed in a favorable manner.

In the medium feeding device, the feed roller and the separation roller may be disposed at a central position in the medium width direction, which is a direction intersecting the medium feeding direction, or may be disposed at each of positions that are symmetric with respect to the central position in the medium width direction and the restricting portions may be disposed at positions that are symmetric with respect to the central position in the medium width direction.

In this case, the restricting portions are disposed at positions that are symmetric with respect to the central position in the medium width direction. Therefore, inclination of the medium held back by the restricting portions can be suppressed in a more favorable manner.

In the medium feeding device, the restricting portions may be positioned in a region corresponding to an outer circumferential surface of the feed roller in the medium feeding direction.

The restricting portions also have a function of restricting the number of media entering a nip portion between the feed roller and the separation roller. Therefore, when a distance from the restricting portions to the nip portion is large, there is a possibility of non-feeding.

In this case, the restricting portions are positioned in the region corresponding to the outer circumferential surface of the feed roller in the medium feeding direction. That is, the restricting portions are positioned near the nip portion between the feed roller and the separation roller. Therefore, the non-feeding can be suppressed.

In the medium feeding device, the restricting portions may be integrally provided with a path member that forms a path in the vicinity of the separation roller in the medium feeding path.

In this case, the restricting portions are integrally provided with the path member that forms the path in the vicinity of the separation roller in the medium feeding path. Therefore, it is possible to dispose the restricting portions at low cost.

In the medium feeding device, the restricting portions may be provided to be able to be displaced in a direction in which the size of a gap, which restricts the number of media proceeding toward the nip position between the separation roller and the feed roller, can be adjusted.

In this case, the restricting portions are provided to be able to be displaced in a direction in which the size of the gap, which restricts the number of media proceeding toward the nip position between the separation roller and the feed roller, can be adjusted. According to this configuration, it is possible to solve non-feeding which occurs when the gap is small.

The medium feeding device may further include a detecting unit that detects drooping of a medium in the medium width direction in a state where a leading end of the medium is placed on the feed roller and the restricting portions may be displaced based on detection information from the detecting unit.

In this case, since the detecting unit that detects drooping of the medium in the medium width direction in a state where the leading end of the medium is placed on the feed roller is provided, it is possible to grasp the rigidity of the medium and to estimate the thickness of the medium. In addition, since the restricting portions are displaced based on the detection information from the detecting unit, the size of the gap can be set to an appropriate size according to the thickness of the medium.

In the medium feeding device, the larger a drooping amount of the medium detected by the detecting unit is, the smaller a size of the gap may be set to be.

In this case, the larger the drooping amount of the medium detected by the detecting unit is, the smaller the size of the gap is set to be since the larger the drooping amount of the medium detected by the detecting unit is, the lower the rigidity of the medium is, that is, the thinner the medium is. Therefore, it is possible to appropriately restrict the number of media proceeding toward the nip position between the separation roller and the feed roller.

According to another aspect of the invention, there is provided an image reading apparatus including a reading unit that reads a medium and the medium feeding device according to the above-described aspect that feeds the medium to the reading unit.

In this case, it is possible to achieve the same effect as the above-described aspect with the image reading apparatus.

BRIEF DESCRIPTION OF THE DRAWINGS

The invention will be described with reference to the accompanying drawings, wherein like numbers reference like elements.

FIG. 14 is a side view illustrating the operation of the restricting portion in a case where the detecting unit according to the fourth embodiment detects a thin sheet.

DESCRIPTION OF EXEMPLARY EMBODIMENTS

Figure 1:
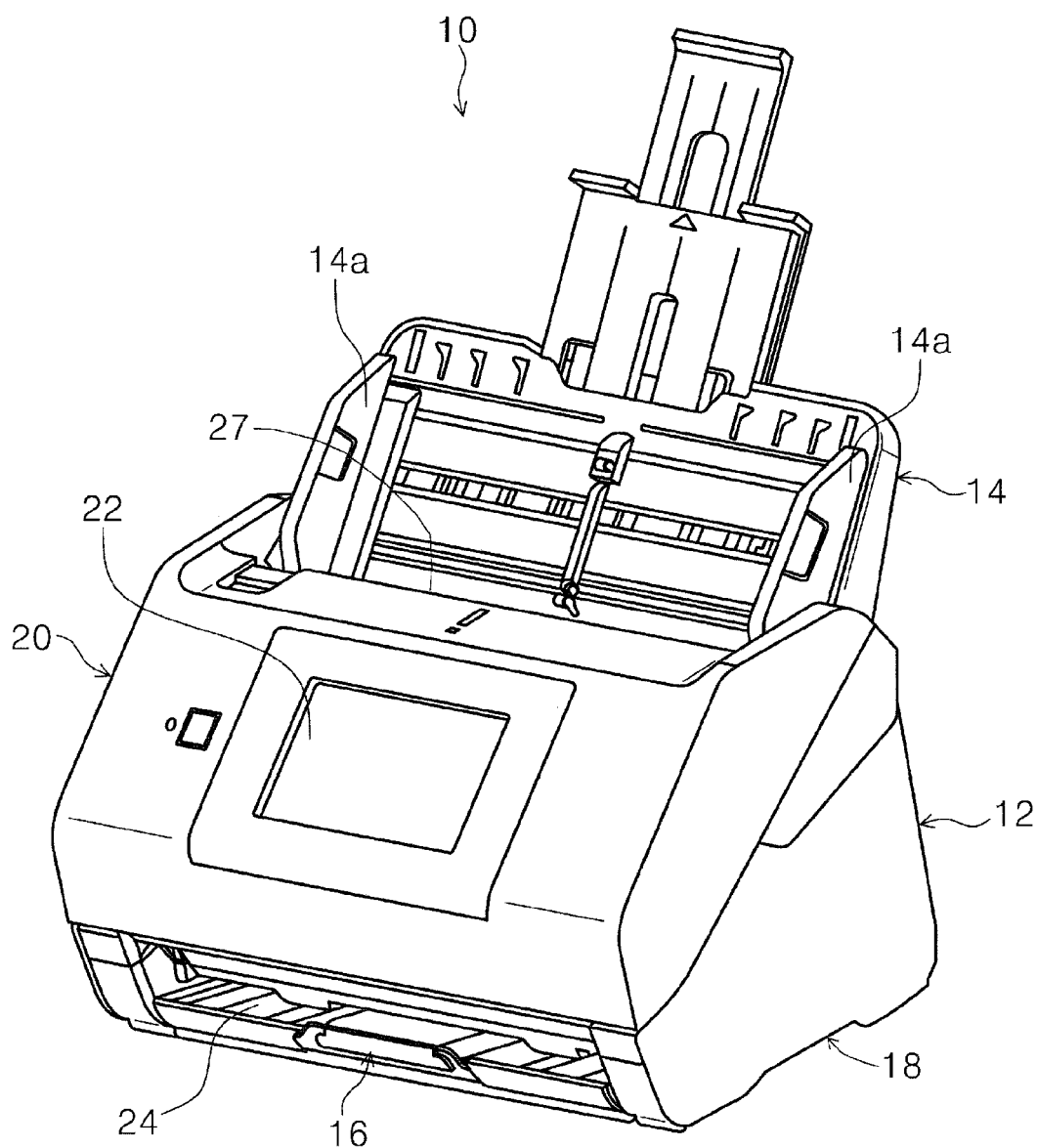
FIG. 1 is a perspective view illustrating the appearance of a scanner according to a first embodiment.

Hereinafter, embodiments of the invention will be described based on the drawings. Note that, the same components in the embodiments will be given the same reference numerals. Description thereof will be made in only in a first embodiment and will be omitted in subsequent embodiments.

Figure 2:
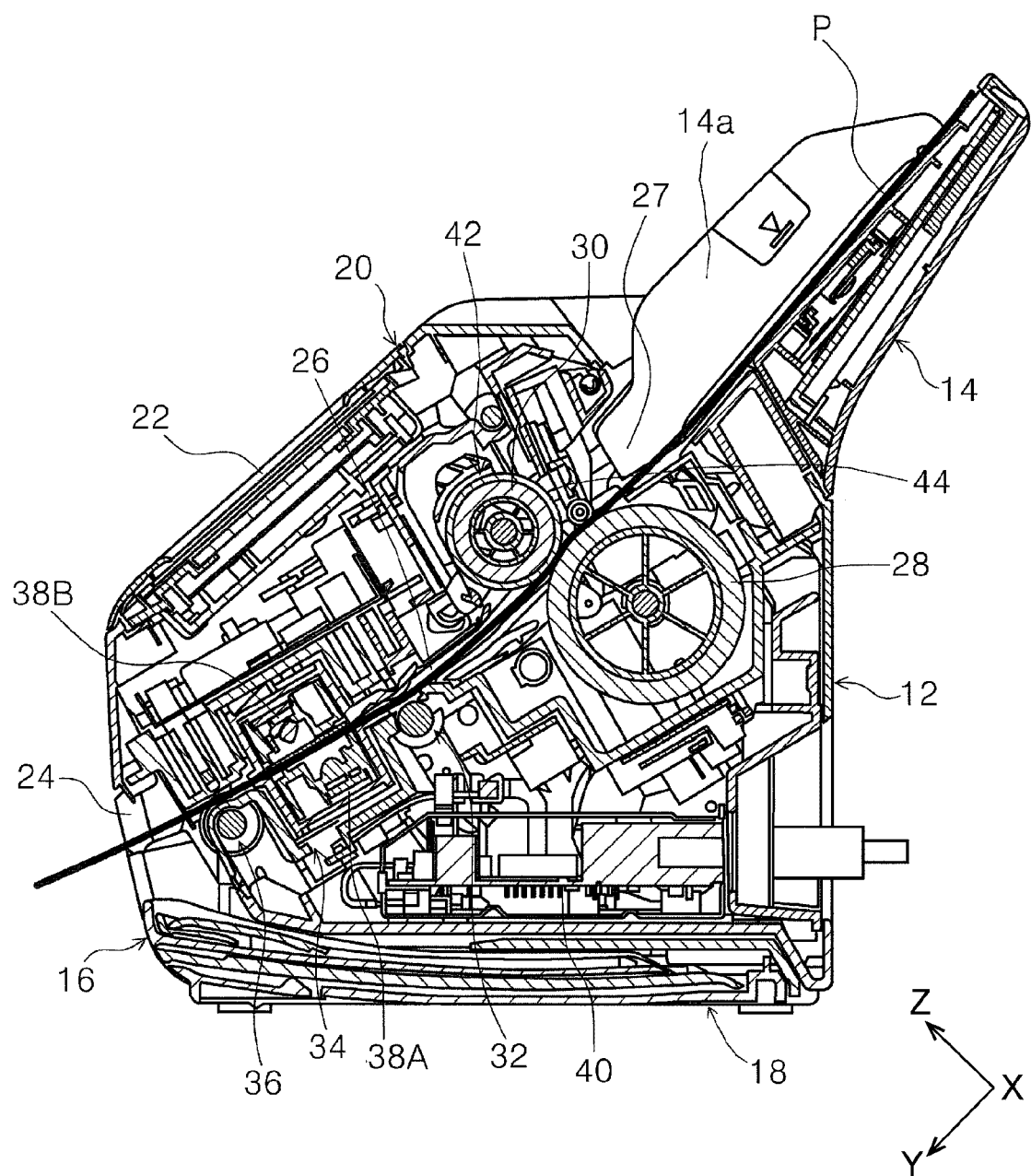
FIG. 2 is a side sectional view illustrating a medium feeding path of the scanner according to the first embodiment.
Figure 3:
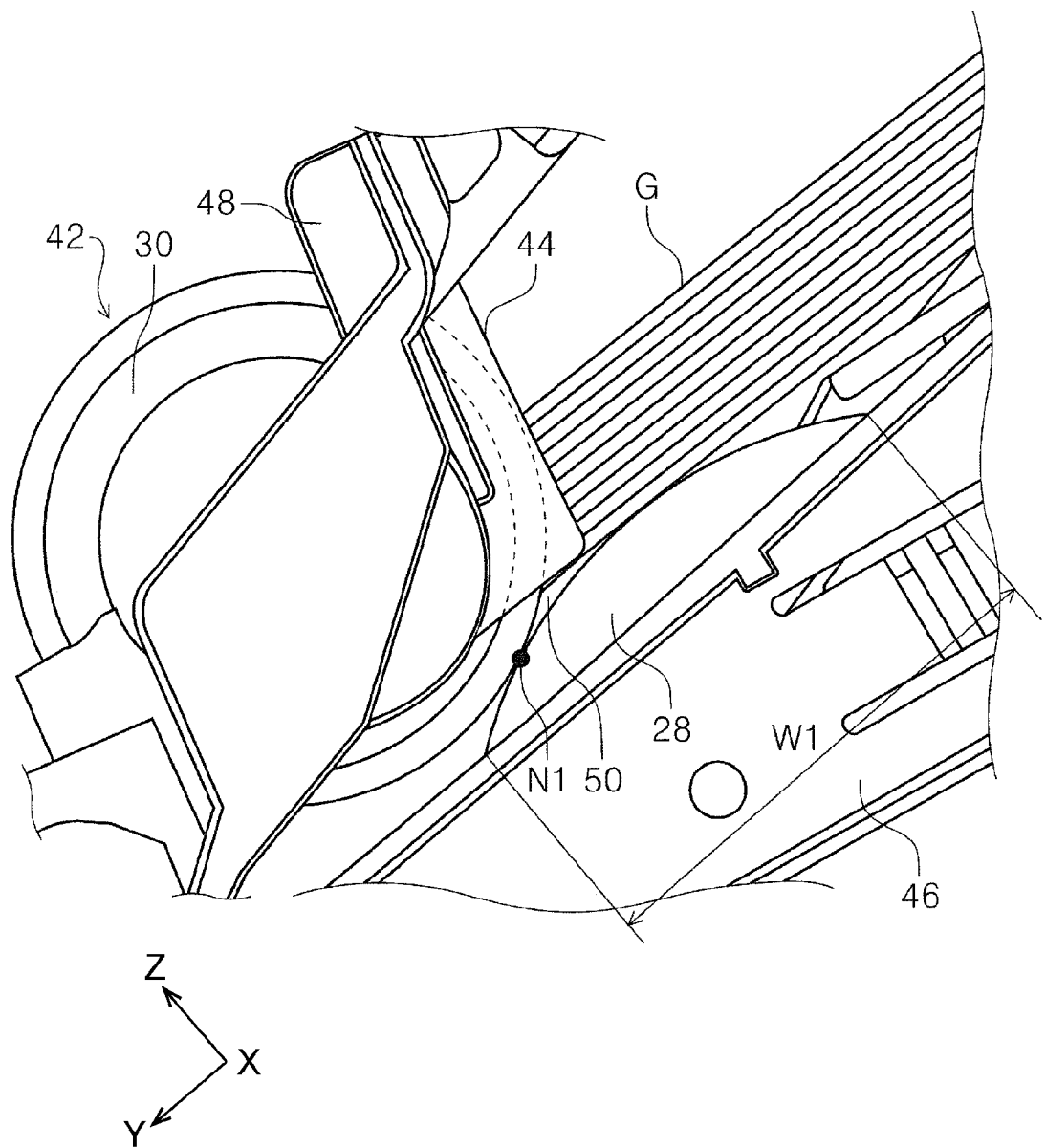
FIG. 3 is a side view of a restricting portion according to the first embodiment.
Figure 4:
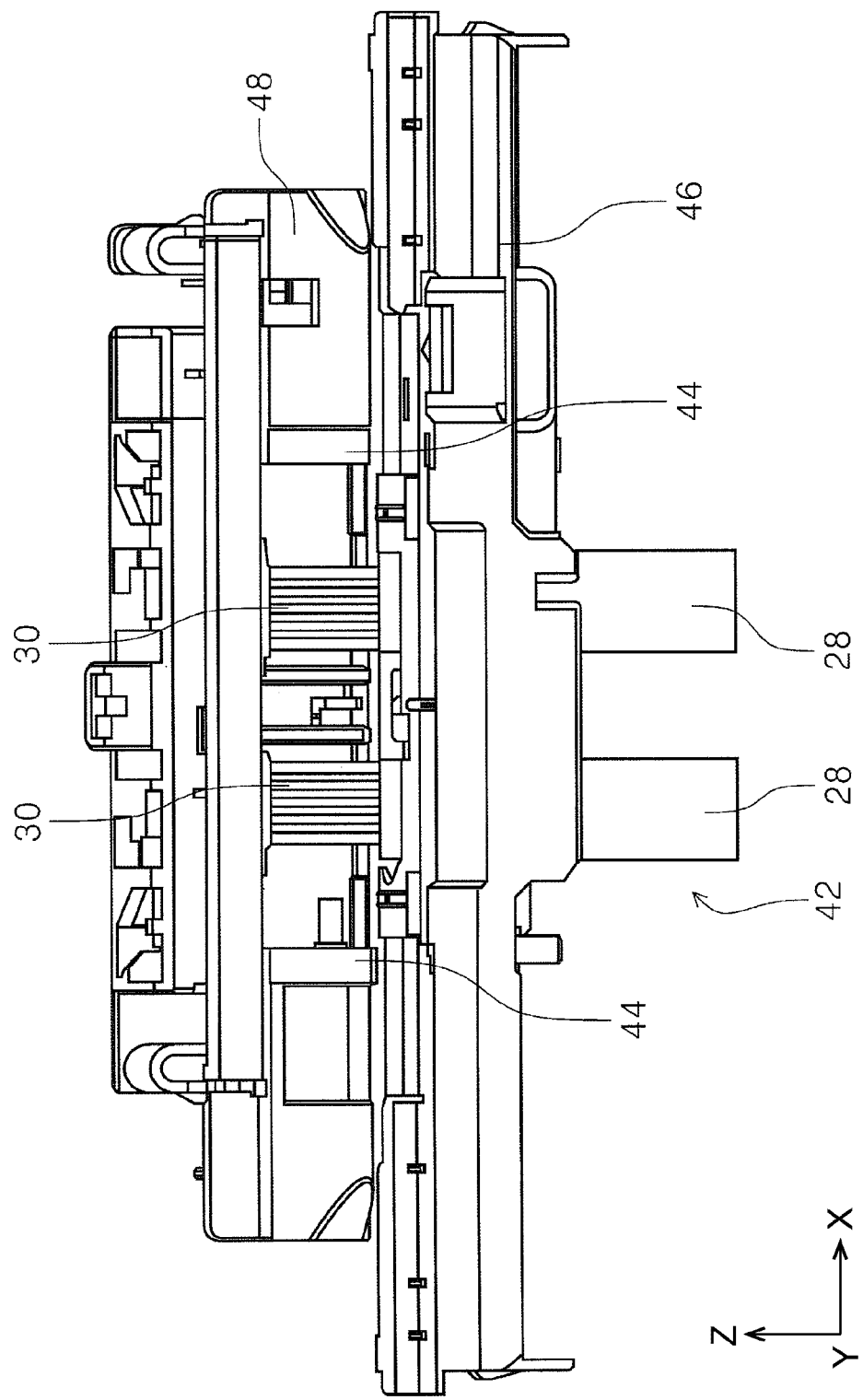
FIG. 4 is a view of a feed roller, a separation roller, and the restricting portion according to the first embodiment as seen from the upstream side in the medium feeding path.

FIG. 1 is a perspective view illustrating the appearance of a scanner according to a first embodiment, FIG. 2 is a side sectional view illustrating a medium feeding path of the scanner according to the first embodiment, FIG. 3 is a side view of a restricting portion according to the first embodiment, and FIG. 4 is a view of a feed roller, a separation roller, and the restricting portion according to the first embodiment as seen from the upstream side in the medium feeding path.

Figure 5:
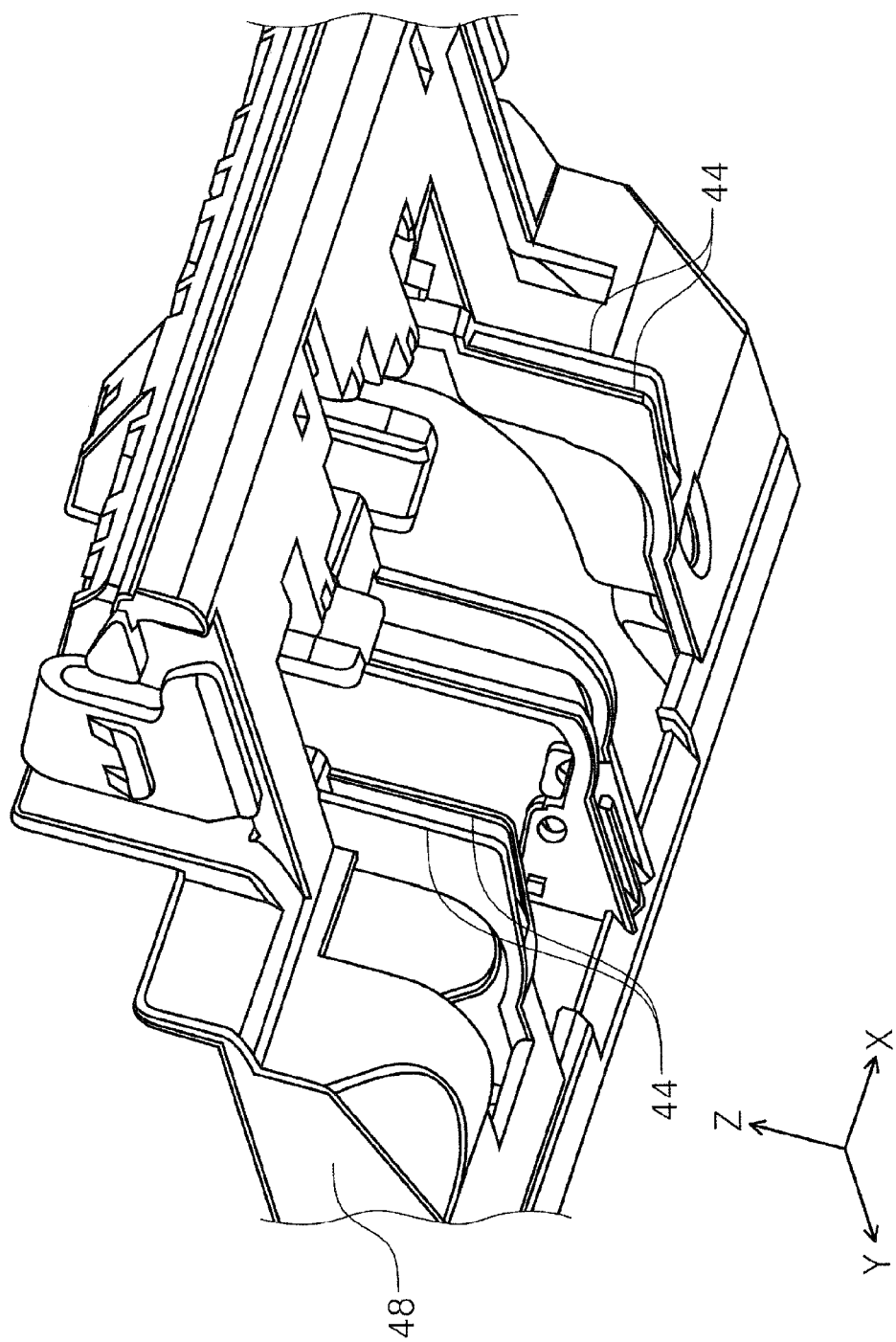
FIG. 5 is a perspective view of a path member provided with the restricting portion according to the first embodiment.
Figure 6:
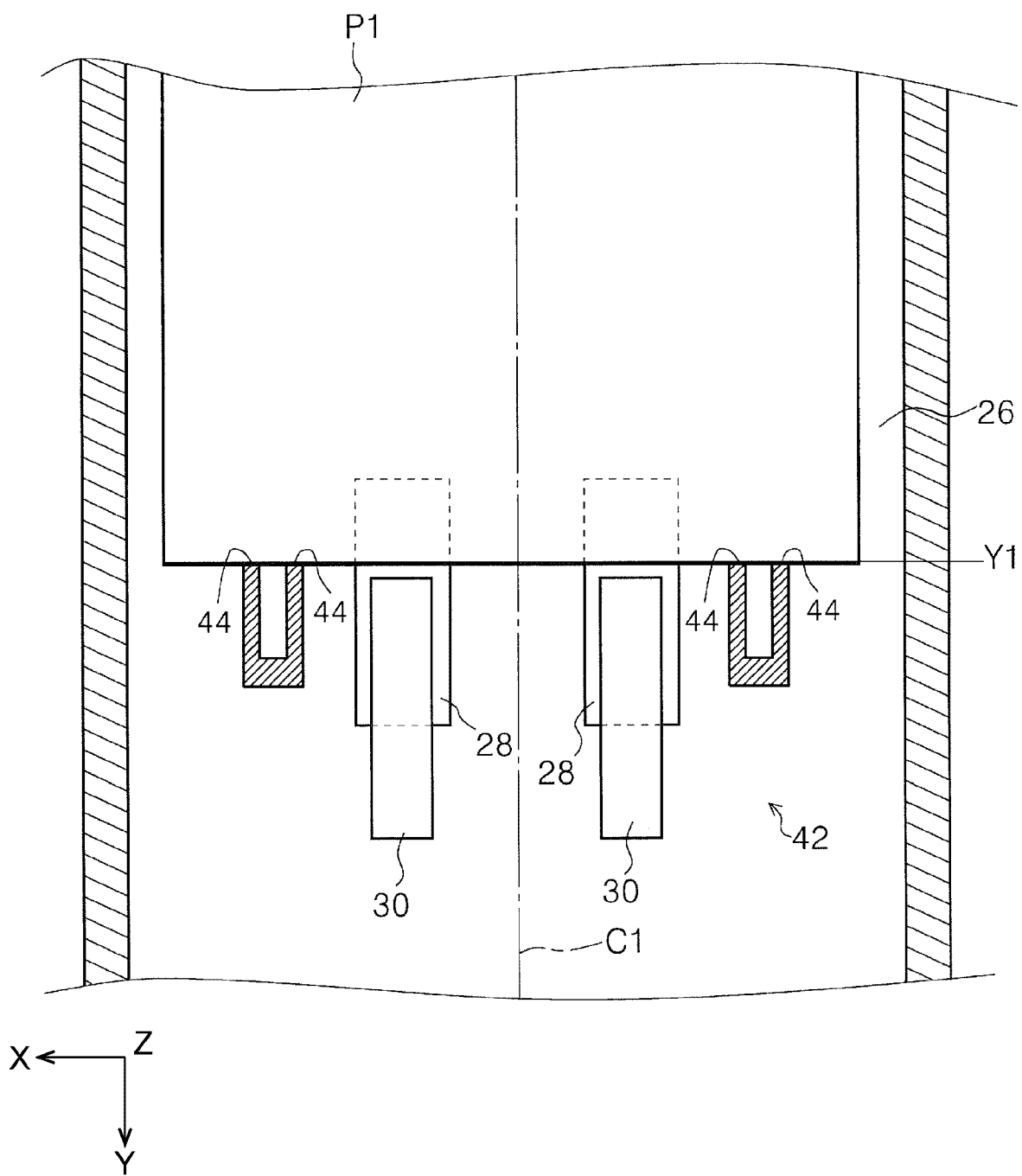
FIG. 6 is a plan view illustrating the positional relationship between the feed roller, the separation roller, and the restricting portion according to the first embodiment in an X axis direction.
Figure 7:
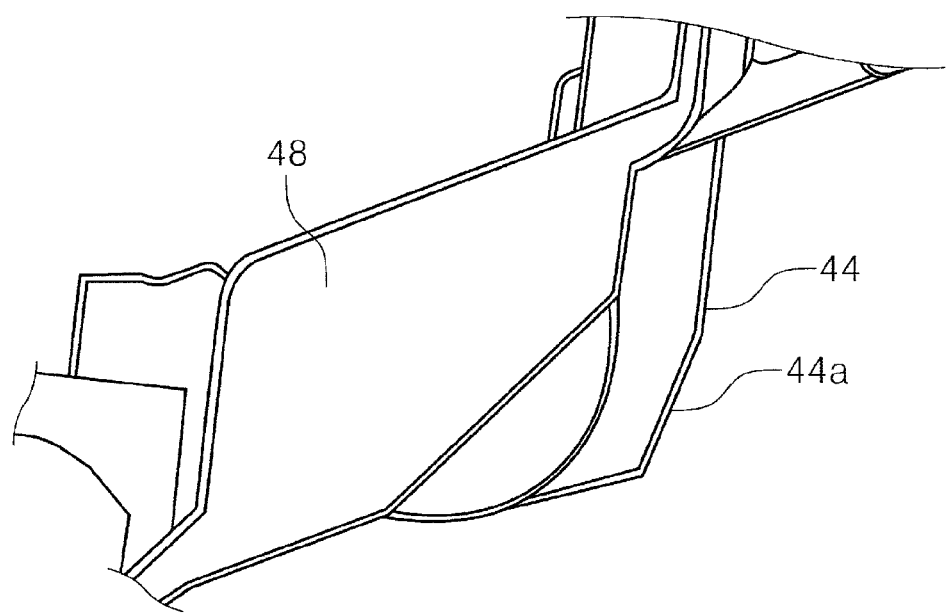
FIG. 7 is a side view illustrating a modified embodiment of the restricting portion according to the first embodiment.
Figure 8:
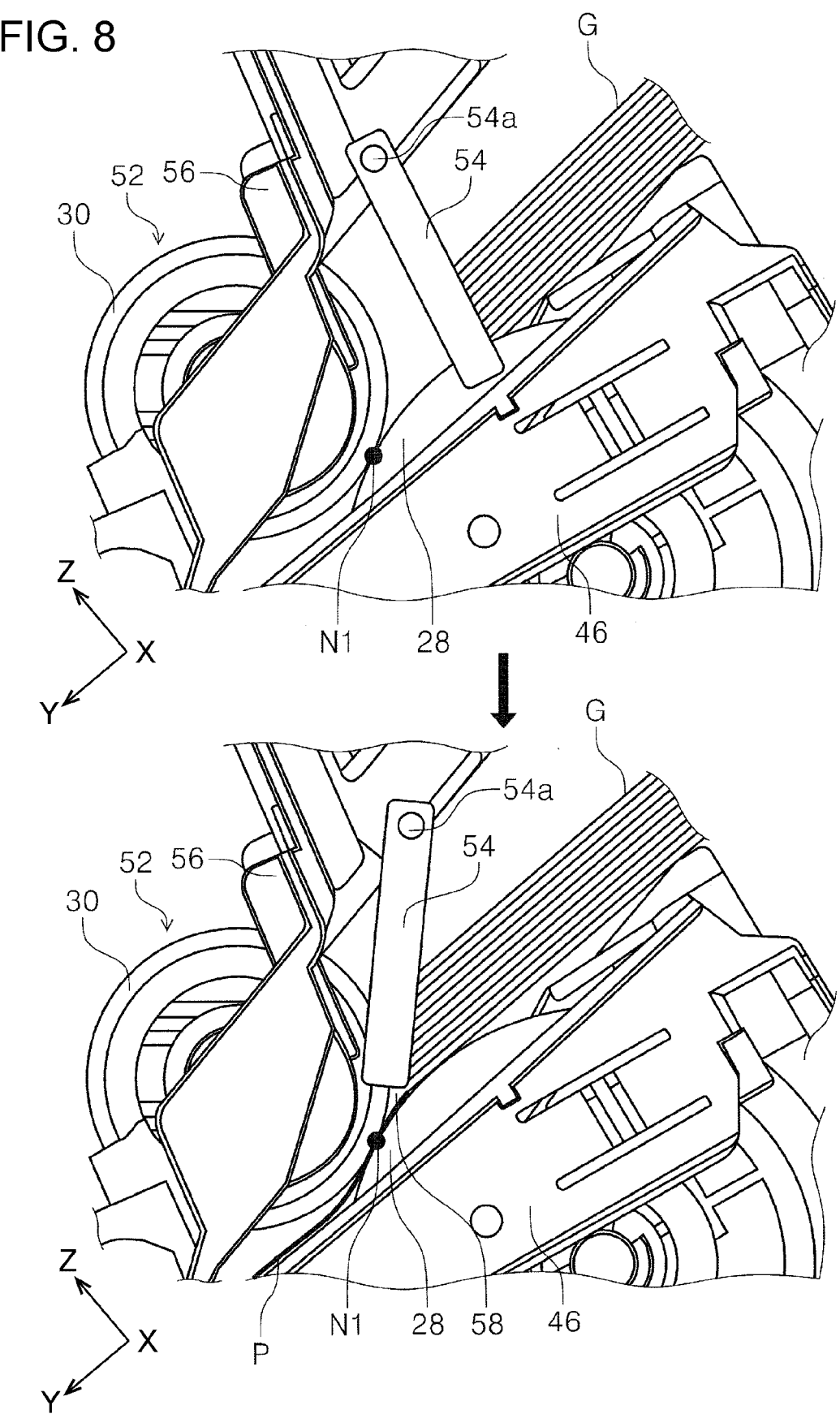
FIG. 8 is a side view illustrating a switch from a non-feeding state to a feeding state of a restricting portion according to a second embodiment.
Figure 9:
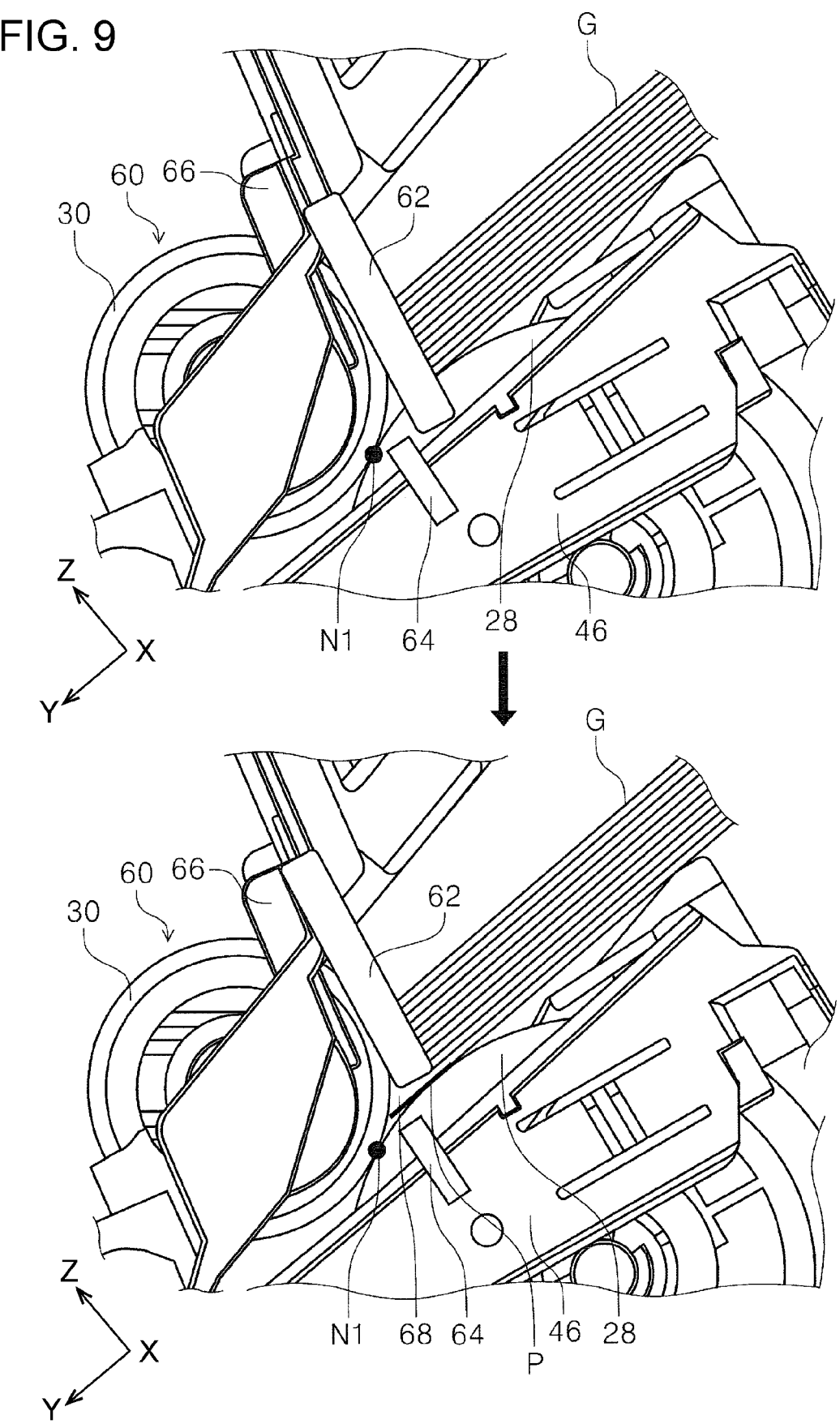
FIG. 9 is a side view illustrating a switch from a non-feeding state to a feeding state of a restricting portion according to a third embodiment.

FIG. 5 is a perspective view of a path member provided with the restricting portion according to the first embodiment, FIG. 6 is a plan view illustrating the positional relationship between the feed roller, the separation roller, and the restricting portion according to the first embodiment in an X axis direction, FIG. 7 is a side view illustrating a modified embodiment of the restricting portion according to the first embodiment, FIG. 8 is a side view illustrating a switch from a non-feeding state to a feeding state of a restricting portion according to a second embodiment, and FIG. 9 is a side view illustrating a switch from a non-feeding state to a feeding state of a restricting portion according to a third embodiment.

Figure 10:
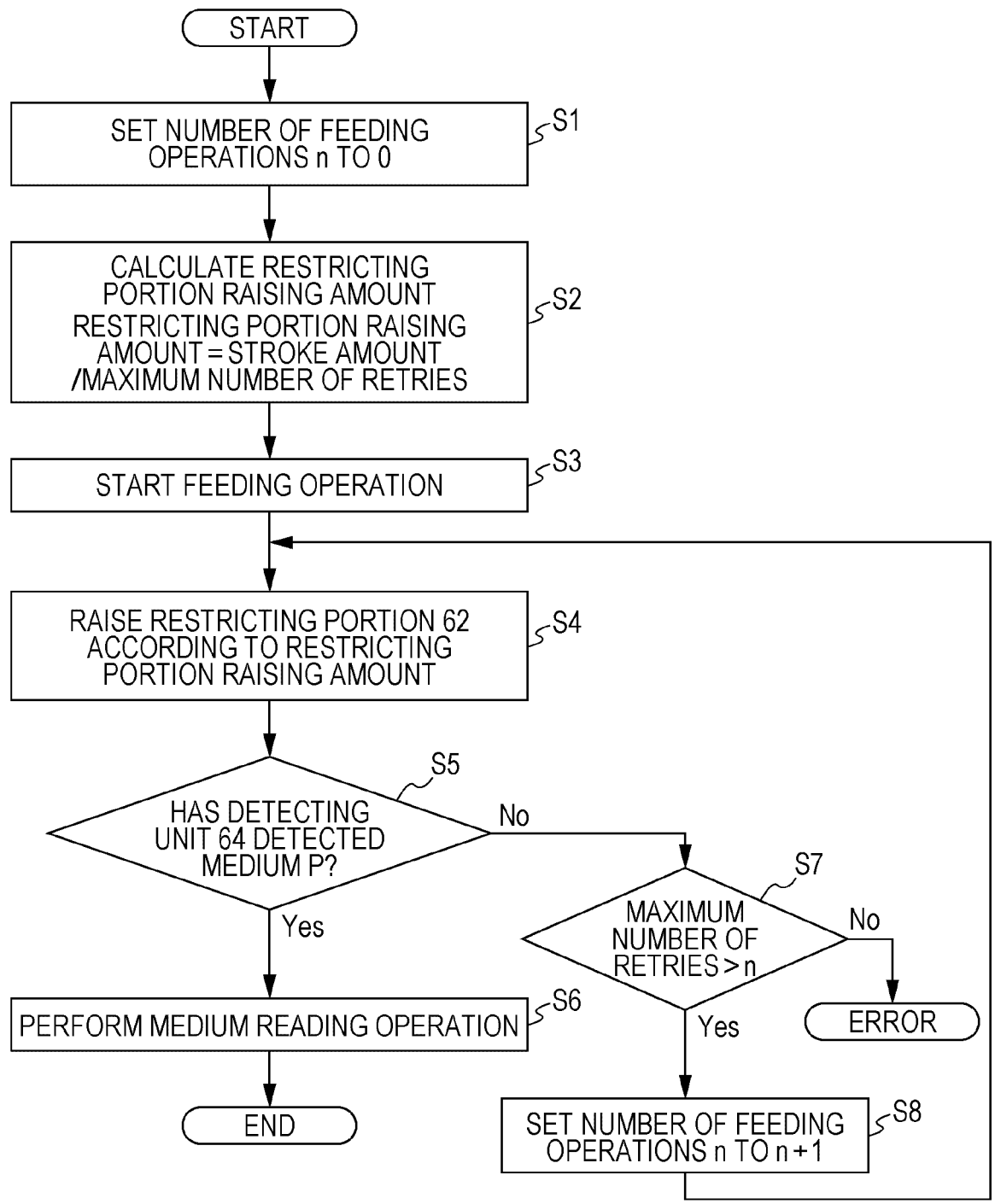
FIG. 10 is a flowchart illustrating the way in which an operation of switching from the non-feeding state to the feeding state of the restricting portion according to the third embodiment is controlled.
Figure 11:
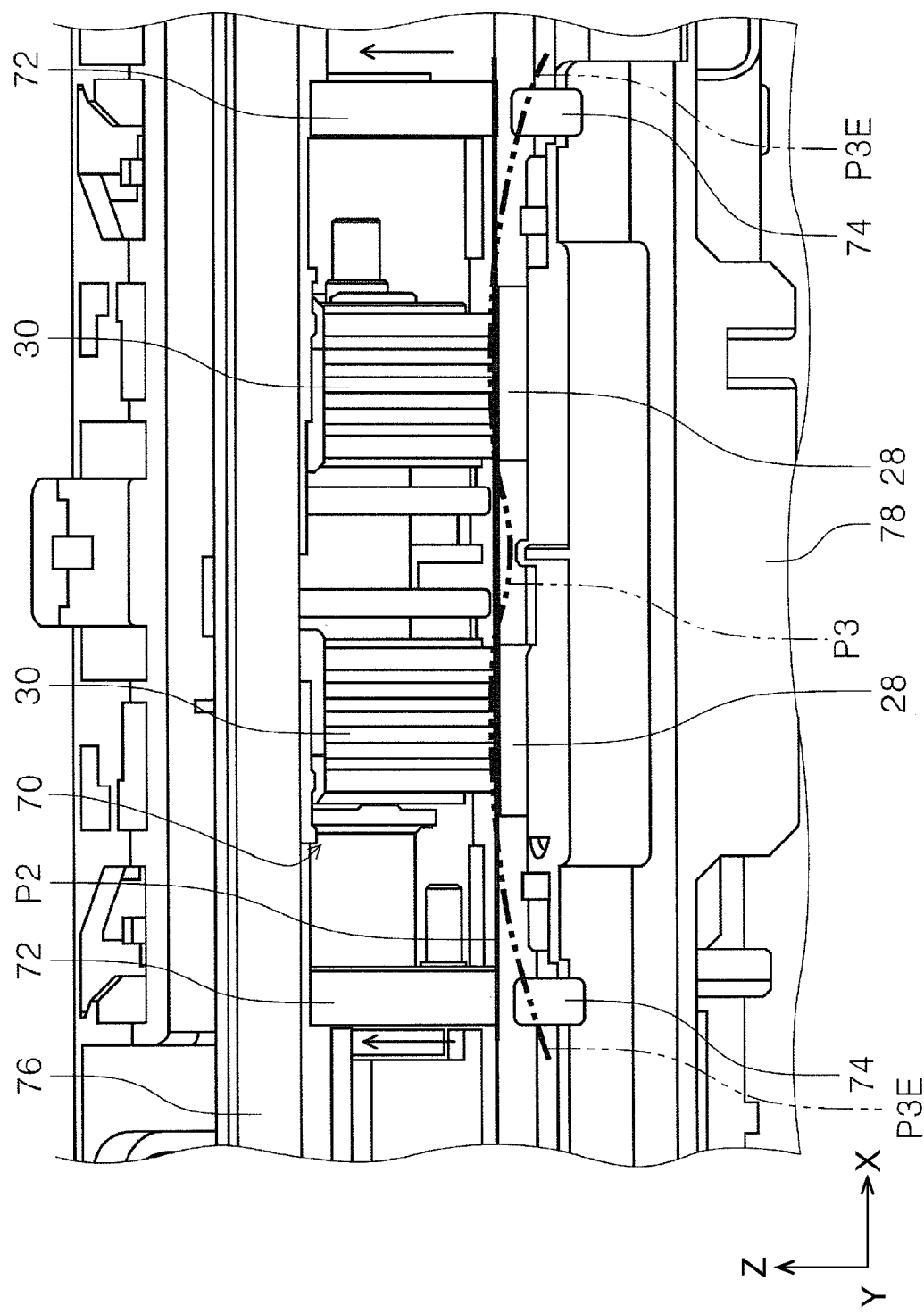
FIG. 11 is a view of a restricting portion and a detecting unit according to the fourth embodiment as seen from the upstream side in the medium feeding path.
Figure 12:
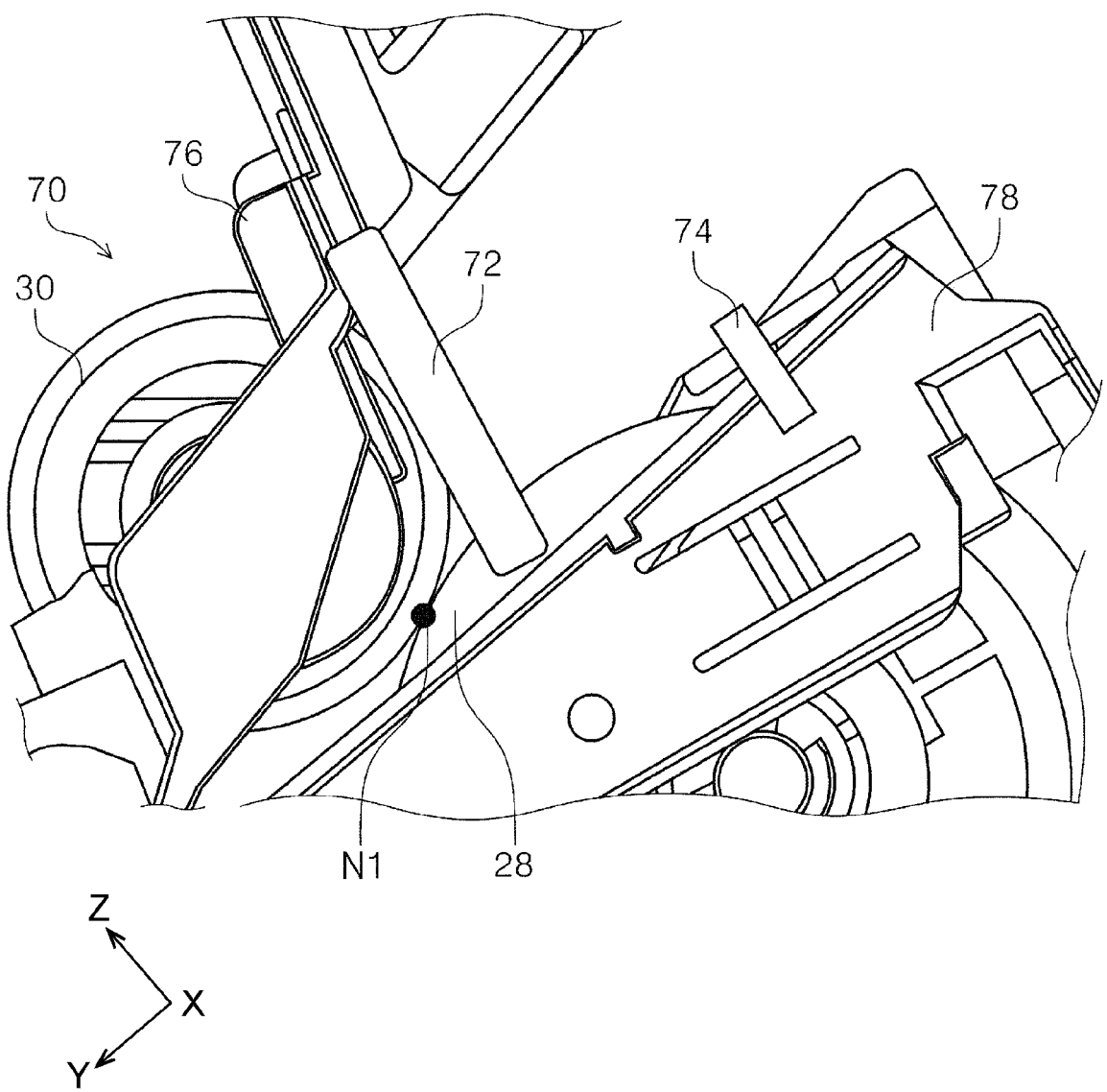
FIG. 12 is a side view of the restricting portion and the detecting unit according to the fourth embodiment.
Figure 13:
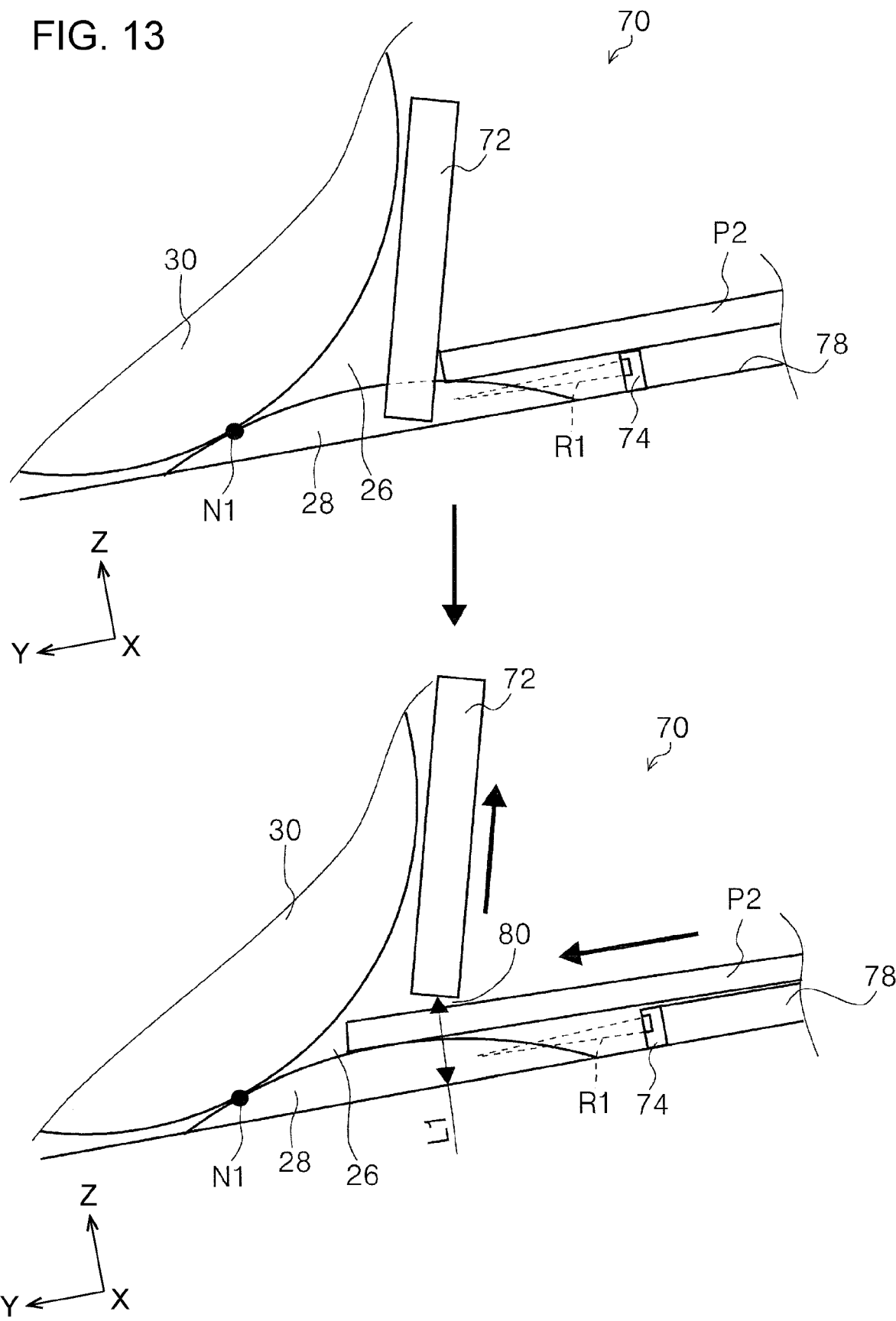
FIG. 13 is a side view illustrating the operation of the restricting portion in a case where the detecting unit according to the fourth embodiment detects a thick sheet.

FIG. 10 is a flowchart illustrating the way in which an operation of switching from the non-feeding state to the feeding state of the restricting portion according to the third embodiment is controlled, FIG. 11 is a view of a restricting portion and a detecting unit according to the fourth embodiment as seen from the upstream side in the medium feeding path, FIG. 12 is a side view of the restricting portion and the detecting unit according to the fourth embodiment, and FIG. 13 is a side view illustrating the operation of the restricting portion in a case where the detecting unit according to the fourth embodiment detects a thick sheet.

Figure 15:
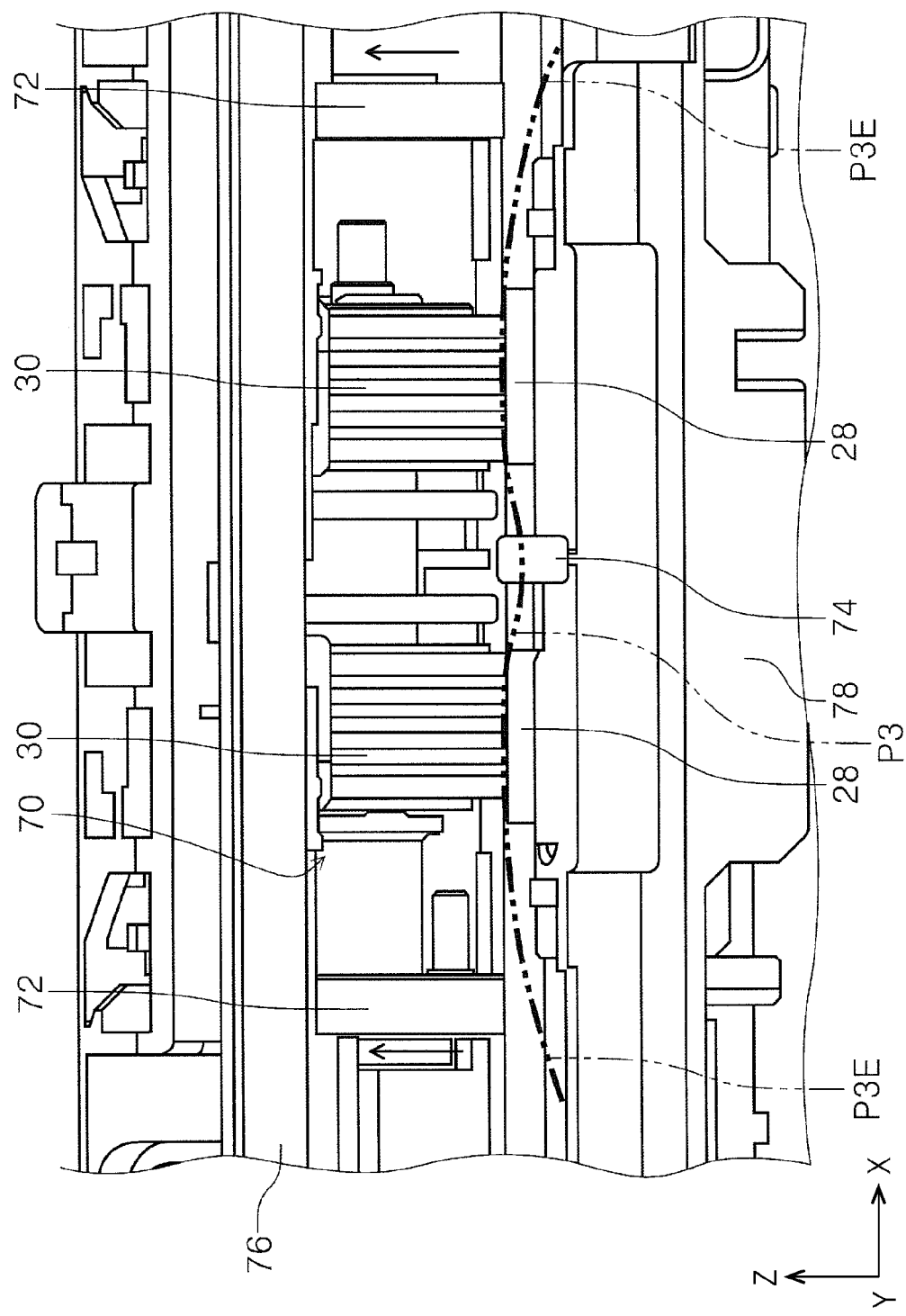
FIG. 15 is a view of a restricting portion and a detecting unit according to a modified embodiment of the fourth embodiment as seen from the upstream side in the medium feeding path.

FIG. 14 is a side view illustrating the operation of the restricting portion in a case where the detecting unit according to the fourth embodiment detects a thin sheet and FIG. 15 is a view of a restricting portion and a detecting unit according to a modified embodiment of the fourth embodiment as seen from the upstream side in the medium feeding path.

In addition, regarding the X-Y-Z coordinate system in each drawing, an X direction is an apparatus width direction and a paper sheet width direction, a Y direction is a paper sheet transportation direction in an image reading apparatus, and a Z direction is a direction orthogonal to the Y direction and a direction approximately orthogonal to a surface of a transported paper sheet. Note that, in each drawing, a +Y direction side is an apparatus front surface side and a −Y direction side is an apparatus rear surface side.

Common Embodiment

In FIGS. 1 and 2, a basic configuration of a scanner 10, which is an image reading apparatus in first to fourth embodiments in the present specification, will be described. The scanner 10 is provided with an apparatus main body 12, a feed tray 14 as a "medium placement portion", and a discharge tray 16. The apparatus main body 12 is provided with a lower unit 18 and an upper unit 20. In the present embodiment, although not shown, the upper unit 20 is attached to the lower unit 18 such that the upper unit 20 can rotate with respect to the lower unit 18 about a +Y direction side end portion.

A user interface unit 22 is provided on a front surface of the upper unit 20. For example, the user interface unit 22 is configured as a touch panel and functions as both of a display unit and an operation unit. By operating the user interface unit 22, it is possible to execute a medium reading operation or the like of the scanner 10.

On a side close to the front surface of the scanner 10, a discharge port 24 is provided below the user interface unit 22. Below the discharge port 24, the discharge tray 16 is provided. In the present embodiment, the discharge tray 16 is configured so as to be able to switch between a state where the discharge tray 16 is accommodated in the lower unit 18 (FIGS. 1 and 2) and a deployed state (not shown) where the discharge tray 16 is drawn out from the lower unit 18 toward the side close to the front surface of the lower unit 18.

Medium Feeding Path

In FIG. 2, a medium feeding path 26 in the scanner 10 will be described. Note that, a thick solid line with a symbol "P" in FIG. 2 illustrates a guidance path of a medium which is transported along the medium feeding path 26 in the scanner 10.

An apparatus rear surface side end portion of the lower unit 18 is provided with the feed tray 14. The feed tray 14 is configured to be able to support a medium (document) in an inclined posture. It is possible to set a plurality of media on the feed tray 14. The feed tray 14 is provided with a pair of edge guides 14a (FIG. 1) that can be displaced in a direction in which the edge guides 14a approach to each other or in a direction in which the edge guides 14a are separated from each other and the pair of edge guides 14a is configured to guide a side edge of a medium placed on the feed tray 14. Furthermore, the feed tray 14 is provided with a medium detecting unit (not shown) such that it is possible to detect that a medium P is set on the feed tray 14. Note that, examples of a medium P in the present embodiment include media having different sizes or having different rigidities such as an A4 paper sheet, a B5 paper sheet, a thick sheet, a photographic paper sheet, a postcard, and a card.

On the path of the medium feeding path 26 in the lower unit 18, a feed port 27, a feed roller 28, a separation roller 30, a pair of transportation rollers 32, an image reading unit 34 as a "reading unit", and a pair of discharge rollers 36 are provided in a direction from the upstream side (−Y direction side) to the downstream side (+Y direction side) in a medium feeding direction. In the present embodiment, the feed roller 28 is driven to rotate by a drive source (not shown) provided in the lower unit 18, for example.

The separation roller 30 is positioned to face the feed roller 28. The separation roller 30 is provided in a state of being urged toward the feed roller 28 by an urging unit (not shown). When a plurality of media enter a space between the feed roller 28 and the separation roller 30, the separation roller 30 separates the plurality of media such that only the lowermost medium, which is to be fed, is fed to the downstream side in the feeding direction. The lowermost medium of a bunch of media G (FIG. 3) that is supported by the feed tray 14 in an inclined posture is nipped by the feed roller 28 and the separation roller 30 and is transported to the pair of transportation rollers 32 disposed on the downstream side in the feeding direction. Thereafter, the pair of transportation rollers 32 feeds a document fed from the feed roller 28 toward the image reading unit 34.

The image reading unit 34 is provided with a first reading unit 38A that is provided in the lower unit 18 to face a second surface of a medium transported along the medium feeding path 26 and a second reading unit 38B that is provided in the upper unit 20 to face a first surface of a document transported along the medium feeding path 26. In the present embodiment, the first reading unit 38A and the second reading unit 38B are configured as a reading unit and for example, the first reading unit 38A and the second reading unit 38B are configured as a contact image sensor module (CISM).

A document that is fed to the image reading unit 34 by the pair of transportation rollers 32 is nipped by the pair of discharge rollers 36 positioned on the downstream side of the image reading unit 34 in the transportation direction and is discharged via the discharge port 24 after an image on at least one of the first and second surfaces of the medium P is read in the image reading unit 34.

In FIG. 2, a controller 40 is provided in the apparatus main body 12. In each embodiment, the controller 40 is configured as an electric circuit provided with a plurality of electric components. In the present embodiment, the controller 40 is configured to control transportation of the medium P in the scanner 10 and an image reading operation. For example, the controller 40 may control an operation that is necessary for executing a medium reading operation in the scanner 10 based on a command from an external device (PC or like).

First Embodiment

In FIGS. 3 to 6, a medium feeding device 42 according to the first embodiment will be described. The medium feeding device 42 according to the present embodiment is provided with the feed tray 14, the feed rollers 28, the separation rollers 30, and restricting portions 44, for example.

Outer layers of the feed rollers 28 and the separation rollers 30 are formed of material that can be elastically deformed and has a high frictional coefficient. For example, the outer layers are formed of ethylene-propylene-diene rubber (EPDM). However, the invention is not limited to this and it is needless to say that the outer layers may be formed of other material suitable in the viewpoint of feeding properties and separation properties.

In the present embodiment, two feed rollers 28 are disposed on the lower unit 18 side as illustrated in FIG. 4, for example. Specifically, the two feed rollers 28 are disposed such that a portion of each feed roller 28 protrudes toward the medium feeding path 26 from a lower path member 46 of the lower unit 18, the lower path member 46 constituting a portion of the medium feeding path 26. Furthermore, the two feed rollers 28 are disposed at positions that are symmetric with respect to the central position in the medium feeding path 26 in the X axis direction. Note that, in the present embodiment, the lower path member 46 forms a path in the vicinity of the feed roller 28 in the medium feeding path 26.

In the present embodiment, two separation rollers 30 are disposed on the upper unit 20 side, for example. Specifically, the two separation rollers 30 are disposed such that a portion of each separation roller 30 protrudes toward the medium feeding path 26 from an upper path member 48 of the upper unit 20, the upper path member 48 being a "path member" constituting a portion of the medium feeding path 26. Furthermore, the two separation rollers 30 are disposed at positions that are symmetric with respect to the central position in the medium feeding path 26 in the X axis direction and that face the feed rollers 28.

In the present embodiment, as illustrated in FIG. 4, the upper path member 48 is provided with a plurality of restricting portions 44 that are provided at an interval in the X axis direction. Specifically, the plurality of restricting portions 44 are disposed at positions that are symmetric with respect to the central position in the medium feeding path 26 in the X axis direction. In the present embodiment, one pair of restricting portions 44 is provided on each of opposite sides interposing the two separation rollers 30 in the X axis direction, for example (FIG. 4). In the present embodiment, one pair of restricting portions 44 is disposed such that the restricting portions 44 are disposed at an interval in the X axis direction. As illustrated in FIG. 5, the restricting portions 44 are integrally formed with the upper path member 48, for example. Note that, in the present embodiment, the upper path member 48 forms a path in the vicinity of the separation rollers 30 in the medium feeding path 26.

In the present embodiment, as illustrated in FIG. 3, the restricting portions 44 are positioned at positions on the upstream side of a nip position N1 between the feed roller 28 and the separation roller 30 in the medium feeding direction in the medium feeding path 26. More specifically, the restricting portions 44 are positioned in a region W1 (region at which feed roller 28 protrudes further than lower path member 46 in FIG. 3) corresponding to an outer circumferential surface of the feed roller 28 in the medium feeding direction.

In FIG. 3, a lower end of the restricting portion 44 faces the feed roller 28. In the present embodiment, a gap 50 is formed between the lower end of the restricting portion 44 and the feed roller 28. The gap 50 is configured such that the lowermost medium of a bunch of media supported by the feed tray 14, which is fed by the feed roller 28, is guided toward the nip position N1 between the feed roller 28 and the separation roller 30. In the present embodiment, the size of the gap 50 in a Z axis direction which is a direction intersecting the medium feeding path 26 is set to the smallest size through which a thick medium such as a thick sheet or a card, which can be fed in the scanner 10, can be fed.

In FIG. 3, the restricting portion 44 protrudes in a −Z direction from the upper path member 48 and extends toward the feed roller 28. The restricting portion 44 is configured to come into contact with leading ends of upper media P of the bunch of media G set on the feed tray 14, excluding at least the lowermost medium P. Therefore, the bunch of media G set on the feed tray 14 in an inclined posture is supported by the restricting portion 44 and displacement thereof toward the downstream side in the medium feeding direction is restricted.

In addition, the restricting portion 44 restricts the leading ends of the upper media P from coming into contact with the separation roller 30, excluding the lowermost medium P. As a result, the restricting portion 44 suppresses the plurality of media P coming into contact with the separation roller 30 and applying a lateral pressure (force generated when leading end of medium abuts onto separation roller 30) to the separation roller 30. When a leading end of a medium applies a lateral pressure to the separation roller 30, it becomes difficult for the separation roller 30 to rotate and the lowermost medium P to be fed becomes less likely to be nipped between the separation roller 30 and the feed roller 28. However, as described above, the restricting portion 44 suppresses a lateral pressure that a leading end of a medium applies to the separation roller 30. Therefore, it is possible to suppress a decrease in feeding performance.

As illustrated in FIG. 6, the plurality of restricting portions 44 are configured to come into contact with leading ends of upper media P1 at positions Y1 in the medium feeding direction, excluding the lowermost medium P. Note that, the medium P1 in FIG. 6 is any one of upper media P excluding the lowermost medium P. Here, the positions Y1 of the restricting portions 44 may not completely coincide with each other in the medium feeding direction and there may be positional deviation in the medium feeding direction to such an extent that a skew does not occur when the medium P1 is fed.

In FIG. 6, the restricting portions 44 are provided at positions that are symmetric with respect to the center of the medium feeding path 26 in a medium width direction. Therefore, the medium P1 set on the feed tray 14 is supported by the restricting portions 44 at positions that are symmetric with respect to the central position in the X axis direction (medium width direction) and displacement thereof toward the downstream side in the feeding direction is restricted. Since the restricting portions 44 receive the medium P1 at positions that are symmetric with respect to the central position in the X axis direction, inclination of the medium P1 with respect to the X axis direction can be suppressed and the posture of the medium P1 in the Y axis direction can be maintained. Note that, a one-dot chain line with a symbol "C1" in FIG. 6 illustrates the center of the medium feeding path 26 in the X axis direction (medium width direction).

Here, when the medium P is fed by being nipped between the separation roller 30 and the feed roller 28, the separation roller 30 receives a transportation force from the feed roller 28 and is pulled toward the downstream side in the feeding direction such that a portion of the separation roller 30 is elastically deformed. When a following end of the medium P passes through the nip position N1 between the feed roller 28 and the separation roller 30, the elastically deformed portion of the separation roller 30 recovers the original state thereof and thus a kickback phenomenon occurs. In the present embodiment, the restricting portion 44 restricts all or a portion of media that are positioned higher than the lowermost medium P from coming into contact with the separation roller 30, excluding at least the lowermost medium P to be fed. Therefore, it is possible to suppress the bunch of media G being inclined due to the kickback phenomenon of the separation roller 30 regardless of whether the separation roller 30 is deformed or not. Therefore, it is possible to suppress a skew of a medium that is fed along the medium feeding path 26 from the bunch of media G to the downstream side in the feeding direction.

To summarize the above description, the medium feeding device 42 is provided with the feed tray 14 on which the bunch of media G, which is a plurality of stacked media P, is placed, the feed roller 28 that feeds the lowermost medium P of the bunch of media G placed on the feed tray 14 by rotating in a state of being in contact with the lowermost medium P, the separation roller 30 that is provided at a position facing the feed roller 28 and separates the lowermost medium P from the bunch of media G, and the plurality of restricting portions 44 that are provided on the upstream side of the nip position N1 between the separation roller 30 and the feed roller 28 at an interval in the X axis direction which is a direction intersecting the Y axis direction and come into contact with leading ends of the upper media P1 of the bunch of media G excluding at least the lowermost medium P such that the leading ends are restricted from coming into contact with the separation roller 30 regardless of whether the separation roller 30 is deformed or not.

According to the above-described configuration, the plurality of restricting portions 44 that come into contact with leading ends of the upper media P1 of the bunch of media G excluding at least the lowermost medium P such that the leading ends are restricted from coming into contact with the separation roller 30 regardless of whether the separation roller 30 is deformed or not are provided on the upstream side of the nip position N1 between the separation roller 30 and the feed roller 28 at an interval in the X axis direction, which is a direction intersecting the Y axis direction. Therefore, even when the above-described kickback phenomenon occurs, an influence on the upper media P1 of the bunch of media G excluding the lowermost medium P can be suppressed and thus a skew caused by the kickback phenomenon can be suppressed.

The restricting portions 44 are positioned on opposite sides interposing the separation roller 30 in the X axis direction, which is a direction intersecting the Y axis direction. According to this configuration, inclination of the medium P1 held back by the restricting portions 44 can be suppressed in a favorable manner.

The feed roller 28 and the separation roller 30 are disposed at the central position in the X axis direction, which is a direction intersecting the Y axis direction, or are disposed at each of positions that are symmetric with respect to the central position in the X axis direction and the restricting portions 44 are disposed at positions that are symmetric with respect to the central position in the X axis direction. According to this configuration, inclination of the medium P1 held back by the restricting portions 44 can be suppressed in a more favorable manner.

The restricting portions 44 are positioned in the region W1 (FIG. 3) corresponding to the outer circumferential surface of the feed roller 28 in the Y axis direction. Here, the restricting portions 44 also have a function of restricting the number of media P entering a nip portion, that is, the gap 50 between the feed roller 28 and the separation roller 30. Therefore, when a distance from the restricting portions 44 to the nip position N1 is large, there is a possibility of non-feeding. According to the configuration in the present embodiment, the restricting portions 44 are positioned in the region W1 corresponding to the outer circumferential surface of the feed roller 28 in the Y axis direction. That is, the restricting portions 44 are positioned near the nip position N1 between the feed roller 28 and the separation roller 30. Therefore, the non-feeding can be suppressed.

The restricting portions 44 are integrally provided with the upper path member 48 that forms a path in the vicinity of the separation roller 30 in the medium feeding path 26. According to the configuration, it is possible to dispose the restricting portions 44 at low cost.

The scanner 10 is provided with the image reading unit 34 that reads a medium and the medium feeding device 42 that feeds the medium P toward the image reading unit 34.

Modification Example of First Embodiment (1) In the present embodiment, two feed rollers 28 and two separation rollers 30 are provided and are disposed at positions that are symmetric with respect to the central position in the medium feeding path 26 in the X axis direction, for example. However, instead of the above-described configuration, one feed roller 28 and one separation roller 30 may be provided and may be disposed at the central position in the medium feeding path 26 in the X axis direction.

(2) As illustrated in FIG. 7, a lower portion of the restricting portion 44 may be provided with a guiding portion 44a that is inclined toward the downstream side in the medium feeding direction. Since the guiding portion 44a is provided, a leading end of the medium P1 of which displacement toward the downstream side in the medium feeding direction is restricted by the restricting portion 44 can be smoothly guided into the gap 50. Furthermore, the guiding portion 44a may be formed to have an R-shape or a stepped shape facing the downstream side in the feeding direction instead of an inclined shape.

Second Embodiment

The above-described medium feeding device 42 provided in the scanner 10 may be replaced with a medium feeding device 52 according to the second embodiment which will be described below. Hereinafter, a configuration of the medium feeding device 52 according to the second embodiment will be described in FIG. 8. Note that, the same components as those in the first embodiment will be described by using the same reference numerals.

The medium feeding device 52 in the present embodiment is provided with the feed tray 14, the feed roller 28, the separation roller 30, and restricting portions 54, for example. Each restricting portion 54 is formed to have a lever-like shape and is attached such that the restricting portion 54 can rotate relative to an upper path member 56 about a rotary shaft 54a. Furthermore, the restricting portions 54 are disposed at positions that are symmetric with respect to the central position in the medium feeding path 26 with the separation roller 30 interposed therebetween in the X axis direction, as with the first embodiment.

The restricting portions 54 in the present embodiment are configured so as to be able to switch between a non-feeding state illustrated in the upper drawing of FIG. 8 and a feeding state illustrated in the lower drawing of FIG. 8 by being driven by a drive unit (not shown) provided in the scanner 10. Note that, the drive unit (not shown) is controlled by the controller 40.

In a case where an instruction to feed a medium is not input via the user interface unit 22 or an external input unit, the controller 40 causes the restricting portions 54 to enter the non-feeding state as illustrated in the upper drawing of FIG. 8. In the present embodiment, the non-feeding state of the restricting portions 54 is a state where the restricting portions 54 block the medium feeding path 26 at a position on the upstream side of the nip position N1 between the feed roller 28 and the separation roller 30. In this state, the restricting portions 54 restrict displacement toward the downstream side in the feeding direction of all media of the bunch of media G set on the feed tray 14 (including lowermost medium P).

In a case where an instruction to feed a medium is input via the user interface unit 22 or an external input unit, the controller 40 drives the drive unit (not shown) such that the restricting portions 54 switch from the non-feeding state (upper drawing of FIG. 8) to the feeding state (lower drawing of FIG. 8) with the rotary shaft 54a as a fulcrum. In the present embodiment, the feeding state of the restricting portions 54 is a state where the restricting portions 54 are inclined toward the downstream side in the feeding direction at a position on the upstream side of the nip position N1 between the feed roller 28 and the separation roller 30 such that a gap 58 is formed between lower end portions of the restricting portions 54 and the feed roller 28. In the present embodiment, the size of the gap 58 in the Z axis direction is set to the smallest size through which a thick medium such as a thick sheet or a card, which can be fed in the scanner 10, can be fed.

Therefore, when the restricting portions 54 are in the feeding state, the lowermost medium P of the bunch of media G set on the feed tray 14 proceeds toward the downstream side through the gap 58. Meanwhile, leading ends of media P that are positioned higher than the lowermost medium P of the bunch of media G are in contact with the restricting portions 54 such that displacement thereof toward the downstream side in the feeding direction is restricted. In this state, media P other than the medium P fed into the gap 58 are inhibited from coming into contact with the separation roller 30 by the restricting portions 54. Therefore, it is possible to suppress a lateral pressure applied to the separation roller 30. As a result, it is possible to suppress a decrease in feeding properties for the medium P.

In addition, since the restricting portions 54 are disposed at positions that are symmetric with respect to the central position in the medium feeding path 26 in the X axis direction, the restricting portions 54 can receive the medium P1 at the positions that are symmetric with respect to the central position in the X axis direction, inclination of the medium P1 with respect to the X axis direction can be suppressed, and the posture of the medium P1 in the Y axis direction can be maintained.

Modified Embodiment of Second Embodiment

In the present embodiment, the switch between the non-feeding state and the feeding state of the restricting portions 54 is performed by means of the drive unit (not shown). However, instead of the above-described configuration, the switch between the non-feeding state and the feeding state may be performed by pressing the restricting portions 54 toward the upstream side in the medium feeding direction with a pressing unit such as a spring member, for example. Specifically, the rotary shaft 54a is provided with a cam member (not shown). The cam member is rotated by the drive unit (not shown) such that rotary shaft 54a and the lever-shaped restricting portions 54 are rotated toward the downstream side in the feeding direction. In this manner, the restricting portions 54 switch from the non-feeding state to the feeding state such that the gap 58 is formed between the restricting portions 54 and the feed roller 28.

Third Embodiment

The above-described medium feeding device 42 provided in the scanner 10 may be replaced with a medium feeding device 60 according to the third embodiment which will be described below. Hereinafter, a configuration of the medium feeding device 60 according to the third embodiment will be described in FIG. 9. Note that, the same components as those in the first embodiment will be described by using the same reference numerals.

The medium feeding device 60 in the present embodiment is provided with the feed tray 14, the feed roller 28, the separation roller 30, restricting portions 62, and a detecting unit 64. The restricting portions 62 are provided on an upper path member 66 and are configured to be able to advance or retreat with respect to the medium feeding path 26 in the Z axis direction by means of the drive unit (not shown) controlled by the controller 40. Furthermore, the restricting portions 62 are disposed at positions that are symmetric with respect to the central position in the medium feeding path 26 with the separation roller 30 interposed therebetween in the X axis direction, as with the first embodiment.

The restricting portions 62 in the present embodiment are configured so as to be able to be displaced between a non-feeding state illustrated in the upper drawing of FIG. 9 and a feeding state illustrated in the lower drawing of FIG. 9 by being driven by the drive unit (not shown) provided in the scanner 10. Note that, the drive unit (not shown) is controlled by the controller 40.

In the present embodiment, the detecting unit 64 is disposed on the downstream side of the restricting portions 62 in the medium feeding direction and is disposed on the upstream side of the nip position N1 between the feed roller 28 and the separation roller 30 in the medium feeding direction. In the present embodiment, the detecting unit 64 is configured as an optical sensor, for example. However, the detecting unit 64 may be another type of detecting sensor such as a lever-shaped mechanical sensor, for example. The controller 40 controls the drive unit (not shown) based on detection information of the medium P from the detecting unit 64 such that the restricting portions 62 move upward or downward.

In a case where an instruction to feed a medium is not input via the user interface unit 22 or an external input unit, the controller 40 causes the restricting portions 62 to enter the non-feeding state as illustrated in the upper drawing of FIG. 9. In the present embodiment, the non-feeding state of the restricting portions 62 is a state where the restricting portions 62 block the medium feeding path 26 by advancing up to the feed roller 28 side in the Z axis direction at a position on the upstream side of the nip position N1 between the feed roller 28 and the separation roller 30. In this state, the restricting portions 62 restrict displacement toward the downstream side in the feeding direction of all media of the bunch of media G set on the feed tray 14 (including lowermost medium P).

In a case where an instruction to feed a medium is input via the user interface unit 22 or an external input unit, the controller 40 drives the drive unit (not shown) such that the restricting portions 62 are displaced in a +Z axis direction and a gap 68 is formed. When the lowermost medium P of the bunch of media G is guided into the gap 68, the medium P guided into the gap 68 is detected by the detecting unit 64 that is positioned between the restricting portions 62 and the nip position N1 in the medium feeding direction. When the controller 40 receives the detection information of the medium P from the detecting unit 64, the controller 40 stops to drive the drive unit (not shown) and stops displacement of the restricting portions 62 in the Z axis direction.

That is, in this state, the size of the gap 68 between the restricting portions 62 and the feed roller 28 in the Z axis direction is adjusted to be such a size that only the lowermost medium P of the bunch of media G can pass through the gap 68. Therefore, in the present embodiment, the controller 40 can adjust the size of the gap 68 based on medium detection information from the detecting unit 64 and can set the height of the lower end portions of the restricting portions 62 in the Z axis direction to a height that is most suitable for the thickness of the medium P that is fed. As a result, the medium P is smoothly guided into the gap 68 and non-feeding of the medium P can be suppressed.

Furthermore, in this state, leading ends of media other than the lowermost medium P are in contact with the restricting portion 62 such that displacement thereof toward the downstream side in the medium feeding direction is restricted. Therefore, the media other than the lowermost medium P are inhibited from coming into contact with the separation roller 30 by the restricting portions 62. As a result, the restricting portions 62 can suppress the media other than the lowermost medium P applying a lateral pressure to the separation roller 30. Accordingly, it is possible to suppress a decrease in feeding property of the separation roller 30 and the medium P.

In addition, since the restricting portions 62 are disposed at positions that are symmetric with respect to the central position in the medium feeding path 26 in the X axis direction, the restricting portions 62 can receive the medium P1 at the positions that are symmetric with respect to the central position in the X axis direction, inclination of the medium P1 with respect to the X axis direction can be suppressed, and the posture of the medium P1 in the Y axis direction can be maintained.

The restricting portions 62 are provided to be able to be displaced in a direction in which the size of the gap 68, which restricts the number of media proceeding toward the nip position N1 between the separation roller 30 and the feed roller 28, can be adjusted. According to this configuration, it is possible to solve the non-feeding which occurs when the gap 68 is small.

Way in which Controller 40 Controls Restricting Portions 62

In the present embodiment, the controller 40 causes the restricting portions 62 to be displaced in the +Z axis direction after a medium is started to be fed and the controller 40 stops the drive unit (not shown) and performs control such that the restricting portions 62 are positioned in the +Z axis direction at a time point at which the medium P is detected by the detecting unit 64. In FIG. 10, an embodiment of the control performed by the controller 40 in the present embodiment will be described.

In a case where an instruction to feed a medium is input via the user interface unit 22 or the external input unit, the controller 40 sets the number of feeding operations n to 0 (Step S1). Here, regarding the number of feeding operations, a rotating operation of the feed roller 28, which is performed while the medium P moves from the feed tray 14 to a detection position of the detecting unit 64 after the feeding operation is started, corresponds to one time of feeding operation and the number of feeding operations increases each time feeding the medium P is retried as described below.

Next, the controller 40 calculates a restricting portion raising amount (Step S2). Specifically, the controller 40 sets a value, which is obtained by dividing a stroke amount of the restricting portion 62 in the Z axis direction by a set maximum number of retries, as the restricting portion raising amount corresponding to one raising operation of the restricting portion 62. Thereafter, the controller 40 causes the feed roller 28 to rotate and starts the feeding of the medium set on the feed tray 14 (Step S3).

In accordance with the rotation of the feed roller 28, the controller 40 raises the restricting portion 62 in the +Z direction according to a predetermined restricting portion raising amount (Step S4). Accordingly, the gap 68 is formed between the lower end portion of the restricting portion 62 and the feed roller 28. The controller 40 monitors passage of the medium P by means of the detecting unit 64 (Step S5).

In a case where the size of the gap 68 in the Z axis direction is a size through which the fed medium P can pass, the medium P is detected by the detecting unit 64 and the controller 40 determines that the feeding of the medium P has succeeded. Accordingly, the controller 40 causes the image reading unit 34 to perform an operation of reading an image on the medium P (Step S6). Thereafter, the controller 40 terminates the operation of reading the image on the medium P.

In a case where the size of the gap 68 in the Z axis direction is a size through which the fed medium P cannot pass, the medium P is not detected by the detecting unit 64 even after a predetermined period of time elapses and the controller 40 determines that the feeding of the medium P has failed. Here, the predetermined period is set to a time taken for the medium P to move from the feed tray 14 to the detection position of the detecting unit 64, for example.

In a case where the controller 40 determines that the feeding of the medium P has failed, the controller 40 determines whether the number of feeding operations n has reached the maximum number of retries set in advance (Step S7). When the number of feeding operations n is larger than the maximum number of retries, the controller 40 determines that there is an error and terminates the feeding operation. When the number of feeding operations n is smaller than the maximum number of retries, the process proceeds to Step S8. The controller 40 adds 1 to the number of feeding operations n and sets the number of feeding operations n to n+1 (Step S8).

Thereafter, the process returns to Step S4 and the controller 40 raises the restricting portion 62 in the +Z axis direction based on the restricting portion raising amount corresponding to one raising operation. In a case where the medium P is detected by the detecting unit 64 in Step S5 with the restricting portion 62 raised in the +Z direction, the process proceeds to Step S6 and in a case where the medium P is not detected by the detecting unit 64, a flow in which the process returns to Step S4 through Steps S7 and S8 (retrying operation) is repeated.

Fourth Embodiment

The above-described medium feeding device 42 provided in the scanner 10 may be replaced with a medium feeding device 70 according to the fourth embodiment which will be described below. Hereinafter, a configuration of the medium feeding device 70 according to the fourth embodiment will be described in FIGS. 11 to 14. Note that, the same components as those in the first embodiment will be described by using the same reference numerals.

As illustrated in FIG. 11, the medium feeding device 70 in the present embodiment is provided with the feed tray 14, the feed roller 28, the separation roller 30, restricting portions 72, and detecting units 74. The restricting portions 72 are configured to be able to advance or retreat with respect to the medium feeding path 26 in the Z axis direction by means of the drive unit (not shown) controlled by the controller 40. Furthermore, the restricting portions 72 are disposed at positions that are symmetric with respect to the central position in the medium feeding path 26 with the separation roller 30 interposed therebetween in the X axis direction, as with the first embodiment.

The restricting portions 72 in the present embodiment are provided on an upper path member 76 and are configured so as to be able to be displaced between a non-feeding state illustrated in FIG. 12 and a feeding state illustrated in the lower drawing of FIG. 13 and the lower drawing of FIG. 14 by being driven by the drive unit (not shown) provided in the scanner 10. Note that, the drive unit (not shown) is controlled by the controller 40.

In the present embodiment, the detecting units 74 are provided on a lower path member 78 and are disposed at positions that are symmetric with respect to the central position in the medium feeding path 26 in the X axis direction and that face the restricting portions 72. In the present embodiment, the detecting units 74 are disposed on the upstream side of the feed roller 28 in the medium feeding direction.

In FIGS. 11 and 13, a case where a medium P2 having a high rigidity such as a thick sheet or a card is fed will be described. The upper drawing of FIG. 13 illustrates a state where the medium P2 having a high rigidity is set on the feed tray 14. In this state, the restricting portions 72 are in the non-feeding state in which the restricting portions 72 block the medium feeding path 26 and a leading end of the medium P2 having a high rigidity is in contact with the restricting portions 72.

Since the medium P2 has a high rigidity, in a state where the leading end of the medium P2 is placed on the feed roller 28 (upper drawing of FIG. 13), a drooping amount by which opposite end portions of the medium P2 in the X axis direction droop in the −Z axis direction is small (refer to solid line with symbol "P2" in FIG. 11). As a result, side ends of the medium P2 do not enter detection regions R1 of the detecting units 74 provided on the upstream side of the feed roller 28 and thus side end portions of the medium P2 are not detected by the detecting units 74. Note that, the solid line with the symbol "P2" in FIG. 11 represents the state of the medium P2 in the medium width direction with the leading end thereof being placed on the feed roller 28. The upper and lower drawings of FIG. 13 are views of a −X axis direction side end portion of the medium P2 as seen from a −X axis direction side.

In the present embodiment, when an operation of feeding the medium P2 is started, the medium P2 is not detected by the detecting units 74 and thus the controller 40 determines that the medium that is fed is the medium P2 having a high rigidity. The controller 40 estimates the thickness of the medium P2 based on the above-described determination and raises the restricting portions 72 in the +Z axis direction by a distance L1 corresponding to the estimated thickness of the medium P2 such that a gap 80 is formed. In this case, the size of the gap 80 is set such that the medium P2 having a high rigidity can pass through the gap 80. Accordingly, the medium P2 having a high rigidity is guided to the nip position N1 between the feed roller 28 and the separation roller 30 through the gap 80. Thereafter, the medium P2 having a high rigidity is nipped between the feed roller 28 and the separation roller 30 and is fed toward the downstream side in the feeding direction.

Meanwhile, in FIGS. 11 and 14, a case where a thin medium P3, of which the rigidity is lower than at least that of the medium P2, is fed will be described. The upper drawing of FIG. 14 illustrates a state where the medium P3 having a low rigidity is set on the feed tray 14. In this state, the restricting portions 72 are in the non-feeding state in which the restricting portions 72 block the medium feeding path 26 and a leading end of the medium P3 having a low rigidity is in contact with the restricting portions 72.

Since the medium P3 has a low rigidity, in a state where the leading end of the medium P3 is placed on the feed roller 28, opposite end portions of the medium P3 in the X axis direction droop to be positioned lower than the feed roller 28 in the Z axis direction (refer to solid line with symbol "P3" in FIG. 11 and refer to upper drawing of FIG. 14). As a result, side end portions P3E of the medium P3 enter the detection regions R1 of the detecting units 74 provided on the upstream side of the feed roller 28 and thus the side end portions P3E of the medium P3 are detected by the detecting units 74. Note that, the two-dot chain line with the symbol "P3" in FIG. 11 represents the state of the medium P3 in the medium width direction with the leading end thereof being placed on the feed roller 28. The upper and lower drawings of FIG. 14 are views of a −X axis direction side end portion of the medium P3 as seen from the −X axis direction side.

In the present embodiment, when an operation of feeding the medium P3 is started, the side end portions P3E of the medium P3 are detected by the detecting units 74 and thus the controller 40 determines that the medium that is fed is the medium P3 having a low rigidity. The controller 40 estimates the thickness of the medium P3 based on the above-described determination and raises the restricting portions 72 in the +Z axis direction by a distance L2 corresponding to the estimated thickness of the medium P3 such that the gap 80 is formed. In this case, the size of the gap 80 is set such that the medium P3 having a low rigidity can pass through the gap 80. Accordingly, the medium P3 having a low rigidity is guided to the nip position N1 between the feed roller 28 and the separation roller 30 through the gap 80. Thereafter, the medium P3 having a low rigidity is nipped between the feed roller 28 and the separation roller 30 and is fed toward the downstream side in the feeding direction. Note that, in the present embodiment, the distance L2 is set to be smaller than the distance L1.

In the present embodiment, in a state where the medium is set on the feed tray 14, the detecting units 74 detect drooping of opposite sides of a leading end of the medium. Based on the detection information, the controller 40 determines the rigidity of the medium, estimates the thickness of the medium from the rigidity of the medium, and causes the restricting portions 72 to be displaced in the +Z axis direction by a displacement amount corresponding to the estimated thickness of the medium.

Here, the larger the drooping amount of the medium is, the lower the rigidity of the medium is and the lower the estimated thickness of the medium is. In the present embodiment, the controller 40 estimates the thickness of the medium according to the drooping amount of the medium and sets the displacement amount of the restricting portions 72 to be small when the thickness of the medium is small. That is, the controller 40 performs control such that the displacement amount of the restricting portions 72 becomes large in a case where the thickness of the medium is large and the displacement amount of the restricting portions 72 becomes small in a case where the thickness of the medium is small. Therefore, it is possible to set the size of the gap 80 to be suitable for the thickness of the medium. As a result, the medium P is smoothly guided into the gap 80 and non-feeding of the medium P can be suppressed.

Furthermore, in this state, leading ends of media other than the lowermost medium P2 or P3 are in contact with the restricting portions 72 such that displacement thereof toward the downstream side in the medium feeding direction is restricted. Therefore, the media other than the lowermost medium P2 or P3 are inhibited from coming into contact with the separation roller 30 by the restricting portions 72. As a result, the restricting portions 72 can suppress the media other than the lowermost medium P2 or P3 applying a lateral pressure to the separation roller 30. Accordingly, it is possible to suppress a decrease in feeding property of the medium P.

In addition, since the restricting portions 72 are disposed at positions that are symmetric with respect to the central position in the medium feeding path 26 in the X axis direction, the restricting portions 72 can receive the medium at the positions that are symmetric with respect to the central position in the X axis direction, inclination of the medium P with respect to the X axis direction can be suppressed, and the posture of the medium P in the Y axis direction can be maintained.

The scanner 10 is provided with the detecting units 74 that detect drooping of a medium in the X axis direction in a state where a leading end of the medium is placed on the feed roller 28, and the restricting portions 72 are displaced based on detection information from the detecting units 74. According to this configuration, since the detecting units 74 that detect drooping of a medium in the X axis direction in a state where a leading end of the medium is placed on the feed roller 28 is provided, it is possible to grasp the rigidity of the medium and to estimate the thickness of the medium. In addition, since the restricting portions 72 are displaced based on the detection information from the detecting units 74, the size of the gap 80 can be set to an appropriate size according to the thickness of the medium.

In the scanner 10, the larger the drooping amount of the medium detected by the detecting units 74 is, the smaller the size of the gap 80 is set to be. According to this configuration, the larger the drooping amount of the medium detected by the detecting units 74 is, the smaller the size of the gap 80 is set to be since the larger the drooping amount of the medium detected by the detecting units 74 is, the lower the rigidity of the medium is, that is, the thinner the medium is. Therefore, it is possible to appropriately restrict the number of media proceeding toward the nip position N1 between the separation roller 30 and the feed roller 28.

Modified Embodiment of Fourth Embodiment

In the present embodiment, the detecting units 74 are provided at positions corresponding to opposite end portions of the medium in the X axis direction in order to detect drooping of the opposite end portions of the fed medium in the X axis direction (FIG. 11). However, instead of the above-described configuration, as illustrated in FIG. 15, the detecting unit 74 may be provided at the central position in the medium feeding path 26 in the X axis direction in order to measure the drooping amount of the medium between the feed rollers 28 arranged in the central portion of the medium feeding path 26 in the X axis direction. According to this configuration, for example, it is possible to detect drooping of the medium P3 having a low rigidity between the feed rollers 28 in the X axis direction and it is possible to cause the restricting portions 72 to be displaced according to the thickness of the medium based on the detection information. In addition, it is possible to reduce the number of detecting units 74 and to simplify the device.

It is a matter of course that the invention is not limited to the above-described embodiments, various modifications can be made within the scope of the invention described in the claims, and the modifications are also included within the scope of the invention.

The entire disclosure of Japanese Patent Application No. 2017-219717, filed Nov. 15, 2017 is expressly incorporated by reference herein.

What is claimed is:

1. A medium feeding device comprising:
   a medium placement portion on which a bunch of media, which is a plurality of stacked media, is placed;
   a feed roller that feeds a lowermost medium of the bunch of media placed on the medium placement portion by rotating in a state of being in contact with the lowermost medium;
   a separation roller that is provided at a position facing the feed roller and separates the lowermost medium from the bunch of media;
   a plurality of restricting portions provided at intervals in a medium width direction, which is a direction intersecting a medium feeding direction, on an upstream side from a nip position between the separation roller and the feeding roller; and
   a controller configured to control a detecting unit that detects drooping of a medium in the medium width direction in a state where a leading end of the medium is placed on the feed roller,
   wherein the plurality of restricting portions are located upstream from a medium contact surface of the separation roller, extend from a part of the apparatus, and contact a leading end of an upper medium, excluding at least the lowest medium in the bunch of media, and restrict contact of the leading end to the separation roller, and
   wherein two restricting portions of the plurality of restricting portions, adjacent in the medium width direction, form an open slot that extends from lower ends of the two restricting portions to an upper path member from which the two restricting portions extend, the open slot being open at a first gap formed between the lower ends and the feed roller.

2. The medium feeding device according to claim 1, wherein the restricting portions are positioned on opposite sides interposing the separation roller in the medium width direction, which is a direction intersecting the medium feeding direction.

3. The medium feeding device according to claim 1, wherein the feed roller and the separation roller are disposed at a central position in the medium width direction, which is a direction intersecting the medium feeding direction, or are disposed at each of positions that are symmetric with respect to the central position in the medium width direction, and wherein the restricting portions are disposed at positions that are symmetric with respect to the central position in the medium width direction.

4. The medium feeding device according to claim 1, wherein the restricting portions are positioned in a region corresponding to an outer circumferential surface of the feed roller in the medium feeding direction.

5. The medium feeding device according to claim 1, wherein the restricting portions are integrally provided with a path member that forms a path in the vicinity of the separation roller in the medium feeding path.

6. The medium feeding device according to claim 1, wherein the restricting portions are provided to be able to be displaced in a direction in which the size of a second gap, which restricts the number of media proceeding toward the nip position between the separation roller and the feed roller, can be adjusted.

7. The medium feeding device according to claim 1, wherein the larger a drooping amount of the medium detected by the detecting unit is, the smaller a size of the gap is set to be.

8. An image reading apparatus comprising:

a reading unit that reads a medium; and the medium feeding device according to claim 1 that feeds the medium to the reading unit.

* * * * *